United States Patent [19]
Matsukubo

[11] Patent Number: 6,088,130
[45] Date of Patent: *Jul. 11, 2000

[54] IMAGE PROCESSING APPARATUS AND METHOD

[75] Inventor: Yushi Matsukubo, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/532,870

[22] Filed: Sep. 22, 1995

[30] Foreign Application Priority Data

Sep. 27, 1994 [JP] Japan .................................. 6-231293
Sep. 27, 1994 [JP] Japan .................................. 6-231294

[51] Int. Cl.[7] .............................. H04N 1/40; H04N 1/04
[52] U.S. Cl. ...................... 358/447; 358/470; 358/529; 382/243
[58] Field of Search ..................... 382/163, 166, 382/198, 233, 243, 244, 190; 358/447, 462, 464, 470, 529, 530, 537, 538, 539, 251.3, 432, 433

[56] References Cited

U.S. PATENT DOCUMENTS

| | | |
|---|---|---|
| 4,754,492 | 6/1988 | Malvar . |
| 4,982,277 | 1/1991 | Ikatoh et al. ............................. 358/529 |
| 5,060,059 | 10/1991 | Mori ....................................... 358/529 |
| 5,084,762 | 1/1992 | Miyakawa ................................ 358/529 |
| 5,189,523 | 2/1993 | Sugiura et al. .......................... 358/300 |
| 5,293,432 | 3/1994 | Gonser et al. ............................. 382/47 |
| 5,361,147 | 11/1994 | Katayama et al. ...................... 358/532 |
| 5,416,606 | 5/1995 | Katayama et al. ...................... 358/467 |
| 5,420,938 | 5/1995 | Funada et al. .......................... 358/529 |
| 5,583,656 | 12/1996 | Gandhi ................................... 358/426 |

FOREIGN PATENT DOCUMENTS

405307594  11/1993  Japan .............................. G06F 15/62

*Primary Examiner*—Jerome Grant, II
*Attorney, Agent, or Firm*—Fitzpatrick Cella Harper & Scinto

[57] ABSTRACT

An image processing apparatus and method are adapted to prevent a decline in image quality while reducing the number of bits in a discrimination signal stored in memory. The apparatus includes an image compressing device for encoding image data in prescribed block units and then storing the encoded data in a memory, after which the stored image data is decoded and outputted. A black-character discriminating unit discriminates a plurality of attributes of the image data, and a black-character compressing device encodes the plural results of discrimination in conformity with the image processing. The plurality of codes are divided into blocks of different sizes in such a manner that resolution is reduced, and the codes are stored in memory. Thereafter, the stored codes are decompressed and sent to a masking UCR circuit and to a spatial filter. On the basis of the codes sent, the masking UCR circuit and spatial filter apply image processing to the image data outputted from the image compressing device.

56 Claims, 25 Drawing Sheets

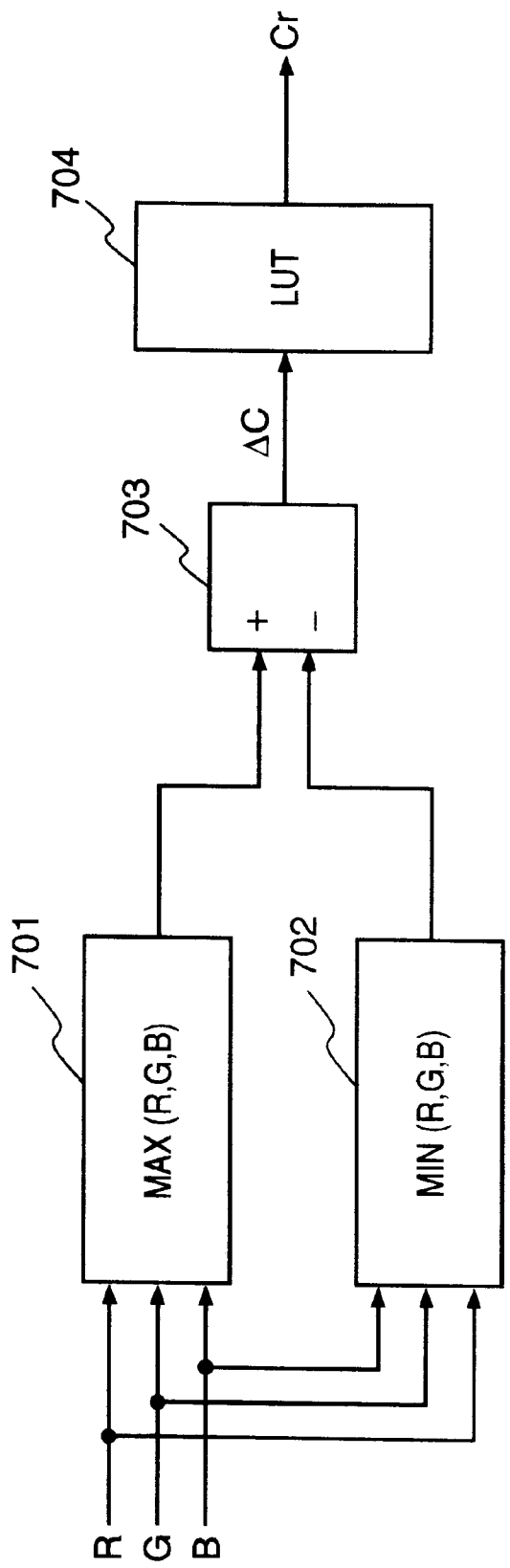

FIG. 13

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

VALUE OF DIRAMI OF NEIGHBORING PIXELS
CENTERED ON PIXEL OF INTEREST

FIG. 17

| PICT_FH | | | | | | | ZONE_P |
|---|---|---|---|---|---|---|---|
| 0 | 1 | 2 | 3 | 4 | 5 | 6 | |
| 1 | 1 | 1 | 1 | 1 | 1 | 1 | 7 |
| 1 | 1 | 1 | 1 | 1 | 1 | 0 | 6 |
| 1 | 1 | 1 | 1 | 1 | 0 | 0 | 5 |
| 1 | 1 | 1 | 1 | 0 | 0 | 0 | 4 |
| 1 | 1 | 1 | 0 | 0 | 0 | 0 | 3 |
| 1 | 1 | 0 | 0 | 0 | 0 | 0 | 2 |
| 1 | 0 | 0 | 0 | 0 | 0 | 0 | 1 |
| 0 | 0 | 0 | 0 | 0 | 0 | 0 | 0 |

FIG. 21A

| INPUT | | | | OUTPUT | | |
|---|---|---|---|---|---|---|
| col | ZONE | edge | FCH | UCR | FILTER | SEN |
| 1 (BLACK) | 0 | no edge | Don't care | 3 | 0 | 0 |
| | | 1 × 1 | Don't care | 0 | 1 | 1 |
| | | 3 × 3 | Don't care | 0 | 1 | 1 |
| | | 5 × 5 | Don't care | 0 | 1 | 1 |
| | | 7 × 7 | Don't care | 0 | 1 | 1 |
| | 1 | no edge | Don't care | 3 | 0 | 0 |
| | | 1 × 1 | Don't care | 1 | 1 | 1 |
| | | 3 × 3 | Don't care | 1 | 1 | 1 |
| | | 5 × 5 | Don't care | 1 | 1 | 1 |
| | | 7 × 7 | Don't care | 3 | 0 | 0 |
| | 2 | no edge | Don't care | 4 | 0 | 0 |
| | | 1 × 1 | Don't care | 2 | 1 | 1 |
| | | 3 × 3 | Don't care | 2 | 1 | 1 |
| | | 5 × 5 | Don't care | 2 | 0 | 0 |
| | | 7 × 7 | Don't care | 4 | 0 | 0 |
| | 3 | no edge | Don't care | 5 | 0 | 0 |
| | | 1 × 1 | Don't care | 3 | 1 | 0 |
| | | 3 × 3 | Don't care | 3 | 1 | 0 |
| | | 5 × 5 | Don't care | 5 | 0 | 0 |
| | | 7 × 7 | Don't care | 5 | 0 | 0 |
| | 4 | no edge | Don't care | 6 | 0 | 0 |
| | | 1 × 1 | Don't care | 4 | 2 | 0 |
| | | 3 × 3 | Don't care | 4 | 2 | 0 |
| | | 5 × 5 | Don't care | 6 | 0 | 0 |
| | | 7 × 7 | Don't care | 6 | 0 | 0 |
| | 5 | no edge | Don't care | 7 | 0 | 0 |
| | | 1 × 1 | Don't care | 5 | 2 | 0 |
| | | 3 × 3 | Don't care | 5 | 2 | 0 |
| | | 5 × 5 | Don't care | 7 | 0 | 0 |
| | | 7 × 7 | Don't care | 7 | 0 | 0 |
| | 6 | no edge | Don't care | 7 | 0 | 0 |
| | | 1 × 1 | Don't care | 6 | 2 | 0 |
| | | 3 × 3 | Don't care | 7 | 0 | 0 |
| | | 5 × 5 | Don't care | 7 | 0 | 0 |
| | | 7 × 7 | Don't care | 7 | 0 | 0 |
| | 7 | no edge | 1 | 7 | 3 | 0 |
| | | 1 × 1 | 1 | 7 | 3 | 0 |
| | | 3 × 3 | 1 | 7 | 3 | 0 |
| | | 5 × 5 | 1 | 7 | 3 | 0 |
| | | 7 × 7 | 1 | 7 | 3 | 0 |
| | | no edge | 0 | 7 | 3 | 0 |
| | | 1 × 1 | 0 | 3 | 0 | 0 |
| | | 3 × 3 | 0 | 7 | 3 | 0 |
| | | 5 × 5 | 0 | 7 | 3 | 0 |
| | | 7 × 7 | 0 | 7 | 3 | 0 |

FIG. 21B

| INPUT | | | | OUTPUT | | |
|---|---|---|---|---|---|---|
| col | ZONE | edge | FCH | UCR | FILTER | SEN |
| 1 (OTHER THAN BLACK) | 0 | no edge | Don't care | 7 | 0 | 0 |
| | | 1 × 1 | Don't care | 7 | 1 | 1 |
| | | 3 × 3 | Don't care | 7 | 1 | 1 |
| | | 5 × 5 | Don't care | 7 | 1 | 1 |
| | | 7 × 7 | Don't care | 7 | 1 | 1 |
| | 1 | no edge | Don't care | 7 | 0 | 0 |
| | | 1 × 1 | Don't care | 7 | 1 | 1 |
| | | 3 × 3 | Don't care | 7 | 1 | 1 |
| | | 5 × 5 | Don't care | 7 | 1 | 1 |
| | | 7 × 7 | Don't care | 7 | 0 | 0 |
| | 2 | no edge | Don't care | 7 | 0 | 0 |
| | | 1 × 1 | Don't care | 7 | 1 | 1 |
| | | 3 × 3 | Don't care | 7 | 1 | 1 |
| | | 5 × 5 | Don't care | 7 | 0 | 0 |
| | | 7 × 7 | Don't care | 7 | 0 | 0 |
| | 3 | no edge | Don't care | 7 | 0 | 0 |
| | | 1 × 1 | Don't care | 7 | 1 | 0 |
| | | 3 × 3 | Don't care | 7 | 1 | 0 |
| | | 5 × 5 | Don't care | 7 | 0 | 0 |
| | | 7 × 7 | Don't care | 7 | 0 | 0 |
| | 4 | no edge | Don't care | 7 | 0 | 0 |
| | | 1 × 1 | Don't care | 7 | 2 | 0 |
| | | 3 × 3 | Don't care | 7 | 2 | 0 |
| | | 5 × 5 | Don't care | 7 | 0 | 0 |
| | | 7 × 7 | Don't care | 7 | 0 | 0 |
| | 5 | no edge | Don't care | 7 | 0 | 0 |
| | | 1 × 1 | Don't care | 7 | 2 | 0 |
| | | 3 × 3 | Don't care | 7 | 2 | 0 |
| | | 5 × 5 | Don't care | 7 | 0 | 0 |
| | | 7 × 7 | Don't care | 7 | 0 | 0 |
| | 6 | no edge | Don't care | 7 | 0 | 0 |
| | | 1 × 1 | Don't care | 7 | 2 | 0 |
| | | 3 × 3 | Don't care | 7 | 0 | 0 |
| | | 5 × 5 | Don't care | 7 | 0 | 0 |
| | | 7 × 7 | Don't care | 7 | 0 | 0 |
| | 7 | no edge | Don't care | 7 | 0 | 0 |
| | | 1 × 1 | Don't care | 7 | 3 | 0 |
| | | 3 × 3 | Don't care | 7 | 0 | 0 |
| | | 5 × 5 | Don't care | 7 | 0 | 0 |
| | | 7 × 7 | Don't care | 7 | 0 | 0 |

FIG. 21

| FIG. 21A |
|---|
| FIG. 21B |

FIG. 23

$$K1 = -255 \times \log\left(\frac{\text{Min CMY}}{255}\right)\left(\frac{1}{1.52}\right) \quad \text{------ (7)}$$

$$\begin{pmatrix} C2 \\ M2 \\ Y2 \\ K2 \end{pmatrix} = \begin{pmatrix} m11 \times k11 & m21 \times k21 & m31 \times k31 & m41 \times k41 & m51 \times k51 & m61 \times k61 & m71 \times k71 & m81 \times k81 \\ m12 \times k12 & m22 \times k22 & m32 \times k32 & m42 \times k42 & m52 \times k52 & m62 \times k62 & m72 \times k72 & m82 \times k82 \\ m13 \times k13 & m23 \times k23 & m33 \times k33 & m43 \times k43 & m53 \times k53 & m63 \times k63 & m73 \times k73 & m83 \times k83 \\ m14 \times k14 & m24 \times k24 & m34 \times k34 & m44 \times k44 & m54 \times k54 & m64 \times k64 & m74 \times k74 & m84 \times k84 \end{pmatrix} \begin{pmatrix} C1 \\ M1 \\ Y1 \\ K1 \\ C1M1 \\ M1Y1 \\ Y1C1 \\ K1K1 \end{pmatrix} \quad \text{---- (8)}$$

IMAGE PROCESSING APPARATUS AND METHOD

BACKGROUND OF THE INVENTION

1. Field of the Invention

This invention relates to an image processing apparatus and method, such as an adaptive-type image processing apparatus and method for executing image processing on the basis of results obtained by extracting the features of an image.

2. Description of the Related Art

Recent years have seen remarkable developments in color printing systems such as color printing apparatuses for digitally processing color image data and outputting the processed data to a color printer to obtain a color image, as well as so-called digital copiers for performing color image copying by subjecting a color original to color separation, reading the colors electrically and printing out the obtained color image data on recording paper. The growing popularity of these systems has been accompanied by the demand for a color-image printing quality that will allow black characters and fine lines to be printed sharply and darkly, as well as a demand for high-speed color output.

In order to meet the demand for higher speed, the single drum arrangement in which an original is scanned four times for the four separated colors M, C, Y, K is being replaced by a system using a four cascaded drums in which scanning of the original need be performed only one time. This system requires a large-capacity memory in which the signals representing the four colors are stored as is. However, since a large-capacity image memory raises the cost of the apparatus, it has been contemplated to reduce the required storage capacity by compressing the image signals before they are stored. It has also been attempted to reduce the required storage capacity by adopting pixel block units of a prescribed size for the storage of results of black-character discrimination, namely by lowering resolution. With this expedient, however, certain problems arise.

Specifically, in the case of a discrimination signal of the type which represents the possibility of a black character by multiple values, the number of bits that must be stored increases and, as a consequence, there is an increase in the amount of information to be stored, even if the results of black-character discrimination are stored in pixel block units. In particular, even if an image signal representing an original is compressed, as mentioned above, the required storage capacity of the overall system cannot be reduced sufficiently when it is attempted to store the results of black-character discrimination in the form of multiple values.

SUMMARY OF THE INVENTION

Accordingly, the present invention seeks to solve the aforementioned problems and its object is to provide an image processing apparatus and method for preventing a decline in image quality while reducing the amount of information in a control signal stored in a memory.

According to the present invention, the foregoing object is attained by providing an image processing apparatus comprising input means for inputting image data, processing means for processing the image data and outputting reproduction data, extracting means for extracting a characteristic of the image data, generating means for generating a control signal of the processing means based upon the characteristic of the image data, compressing means for compressing the control signal, and storing means for storing the compressed control signal.

Another object of the present invention is to clearly reproduce a line-image area in an image.

A further object of the present invention is to use various parameters in color image processing.

A further object of the present invention is to form a color image at high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a block diagram showing an example of the construction of a saturation discriminator depicted in FIG. 2;

FIG. 13 is a diagram showing a signal DIRAMI centered on a pixel of interest;

FIG. 17 is a diagram illustrating an example of an encoding rule in an encoder shown in FIG. 15;

FIG. 21, which includes FIGS. 21A and 21B, is a diagram illustrating an example of an encoding table in an encoder shown in FIG. 2;

FIG. 23 is a diagram showing the arithmetic expressions of UCR and output masking in a masking UCR unit depicted in FIG. 2.

DESCRIPTION OF THE PREFERRED EMBODIMENT

An image processing apparatus embodying the present invention will now be described in detail with reference to the drawings.

[Overview of the Apparatus]

Figure 1:
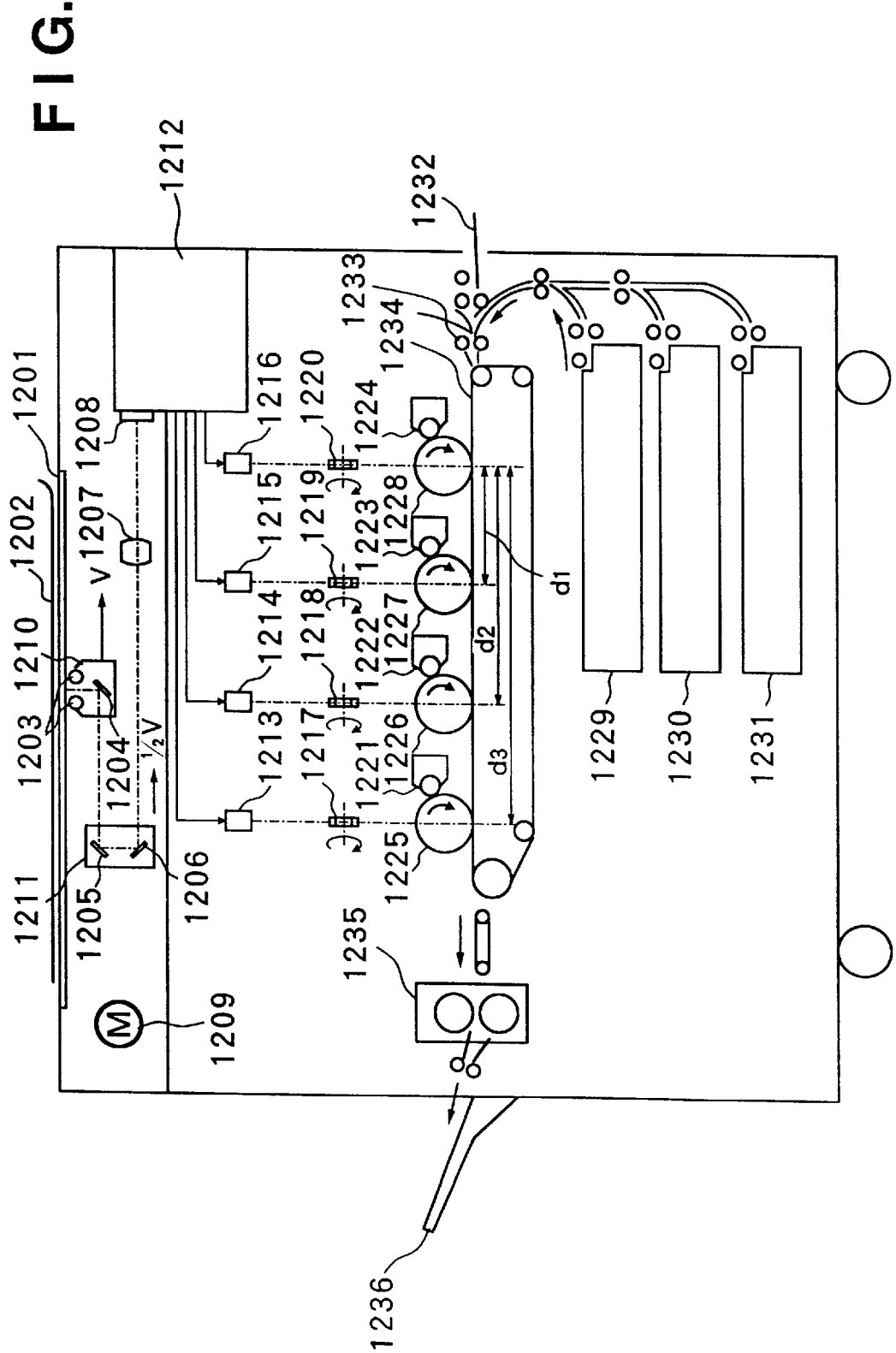
FIG. 1 is a schematic view showing an example of an image processing apparatus embodying the present invention.

FIG. 1 is a schematic view showing an example of an image processing apparatus embodying the present invention.

As shown in FIG. 1, the apparatus includes a glass platen 1201 on which an original 1202 whose image is to be read is placed. The original 1202 is irradiated by illuminating lamps 1203 and reflected light from the original 1202 is reflected by mirrors 1204~1206 and then acted upon by an optical system 1207 so that an image is formed on a sensor 1208. The sensor 1208 is an RGB three-line CCD sensor. A mirror unit 1210 which includes the mirror 1204 and illuminating lamps 1203 and a second mirror unit 1211 which includes the mirrors 1205, 1206 are driven mechanically at velocities V and V/2, respectively, by a motor 1209 so that the entire surface of the original 1202 is scanned.

An image processing section 1212 processes the read image as an electric signal and outputs the results of processing as print signals.

Semiconductor lasers 1213~1216 are driven by the print signals outputted by the image processing section 1212. The laser beams emitted by the respective semiconductor lasers are caused to scan by respective ones of polygon mirrors 1217~1220 so that electrostatic latent images are formed on respective ones of photosensitive drums 1225~1228. Developing units 1221~1224 develop respective ones of the latent images by toners K, Y, C, M, respectively. The toner of each color developed is transferred to the recording paper to obtain a full-color printout.

A sheet of recording paper supplied from any one of record-paper cassettes 1229~1231 or from a manual insertion tray 1232 is introduced via resistance rollers 1233 and conveyed on a transfer belt 1234 while being attracted thereto. The toners of the respective colors, which have been already been developed on the photosensitive drums 1228~1225, are transferred to the recording paper, as the recording paper is conveyed, in sync with the timing of paper feed.

The recording paper to which the toners of the respective colors have been transferred separates from the transfer belt 1234 and is conveyed to a fixing unit 1235, whereby the toners are fixed. The sheet of recording paper is then ejected into a discharge tray 1236.

[Signal Flow]

Figure 2:
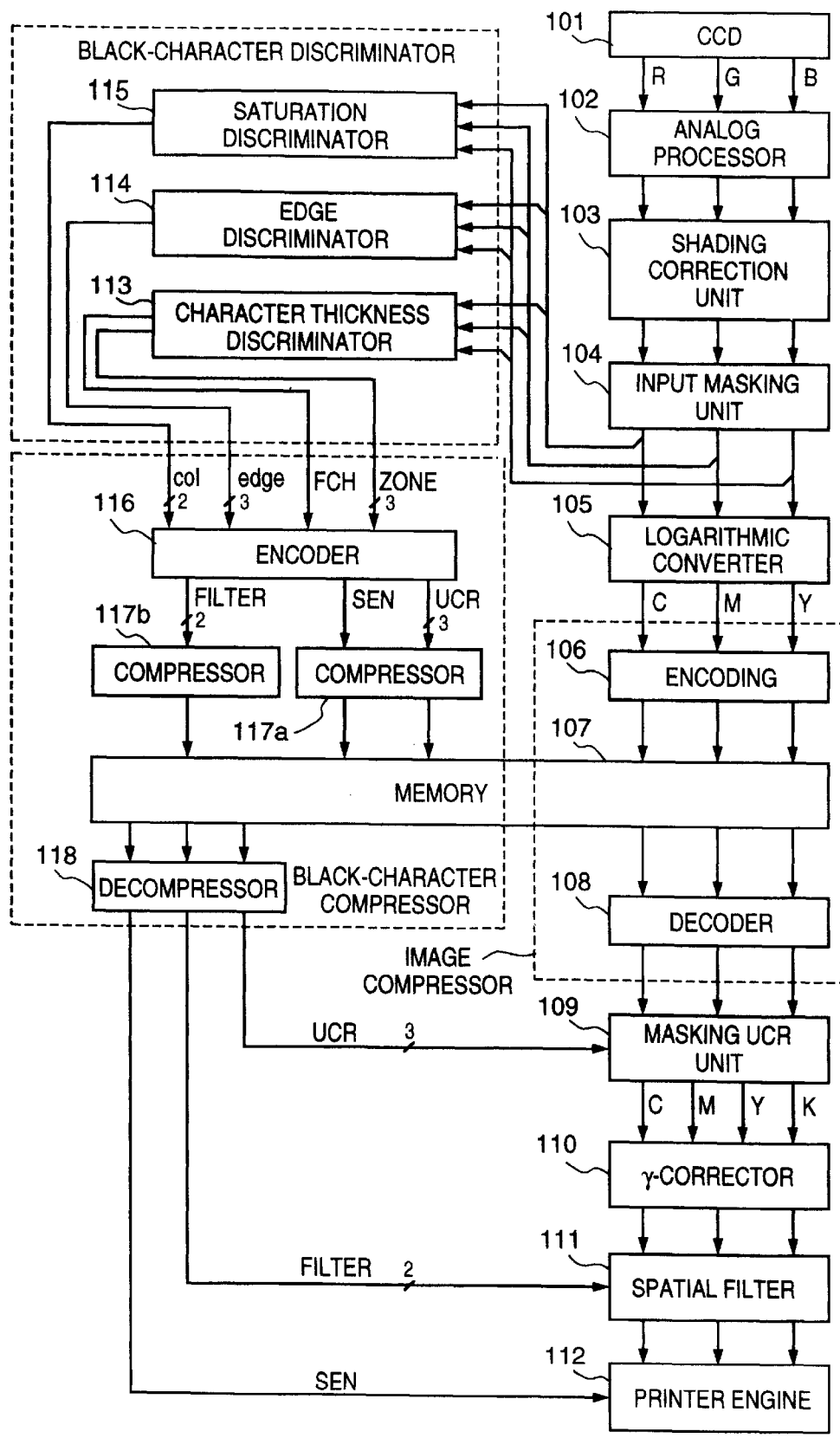
FIG. 2 is a block diagram showing an example of the construction of an image processing section according to this embodiment.

FIG. 2 is a block diagram showing an example of the construction of the image processing section 1212.

As shown in FIG. 2, the image processing section 1212 includes a CCD 101 constituting the sensor 1208. The CCD 101 separates the reflected light from the original 1201 into the three R, G, B components and outputs these as electric signals corresponding to the color components.

An analog processor 102, which comprises an amplifier, a sample-and-hold circuit and an A/D converter, amplifies the output of the CCD 101, samples and holds the signal, converts the signal from an analog to a digital quantity and applies processing such as a black correction, white correction and color balance, thereby outputting a digital image signal of, say, eight bits.

A shading correction unit 103 subjects the output of the analog processor to a correction conforming to the shading characteristic of the image reader. An input masking unit 104 subjects the output of the shading correction unit 103 to masking processing and converts a color-space signal, which is dependent upon the filter characteristic of the sensor 1208, to a standard color-space signal according to the NTSC, by way of example. A logarithmic converter 105 converts RGB luminance signals outputted by the input masking unit 104 to CMY luminance signals of eight bits each, by way of example.

An encoder 106 encodes and compresses the output of the logarithmic converter 105 and stores the results in a memory 107. A decoder 108 decodes and decompresses the compressed image signal stored in the memory 107. The encoder 106, memory 107 and decoder 108 comprise an image compressor. The method of compression used entails performing an orthogonal transformation per block of 4×4 pixels and quantizing the frequency components obtained. For example, it is permissible to use an information non-preserving type encoding method such as the JPEG method, vector quantization, etc.

In dependence upon a black-character discrimination signal UCR, described later, a masking UCR unit 109 subjects the CMY signals from the decoder 108 to undercolor removal and masking processing to correct for toner color impurity and outputs C, M, Y, K signals of, say, eight bits each. A γ-correction unit 110 subjects the output of the masking UCR unit 109 to a γ correction conforming to the color generation characteristic of the recording paper. A spatial filter 111 subjects the output of the γ-correction unit 110 to edge emphasis and smoothing processing in conformity with a black-character discrimination signal FILTER, described later. In conformity with a black-character discrimination signal SEN, describe later, a printer engine 112 performs printing based upon the output of the spatial filter 111.

Detection of a black character or black line image will be described next.

[Edge Detection]

Figure 3:
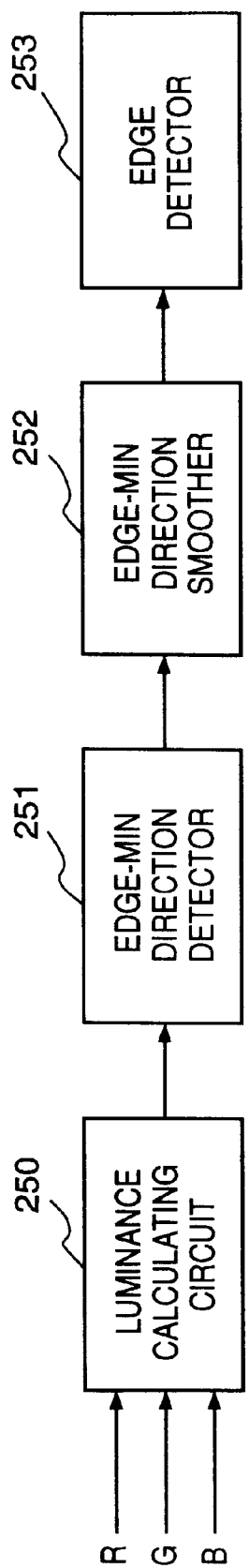
FIG. 3 is a block diagram showing an example of the construction of an edge discriminator depicted in FIG. 2.

Numeral 114 denotes an edge discriminator having a construction of the kind exemplified in FIG. 3. The image signal from the input masking unit 104 is applied to the edge discriminator 114, which detects the edge portion of the image.

As shown in FIG. 3, the edge discriminator includes a luminance calculating circuit 250 for converting the input R, G, B signals into a luminance signal Y in accordance with the following equation:

$$Y = 0.25R + 0.5G + 0.25B \tag{1}$$

Figure 4:
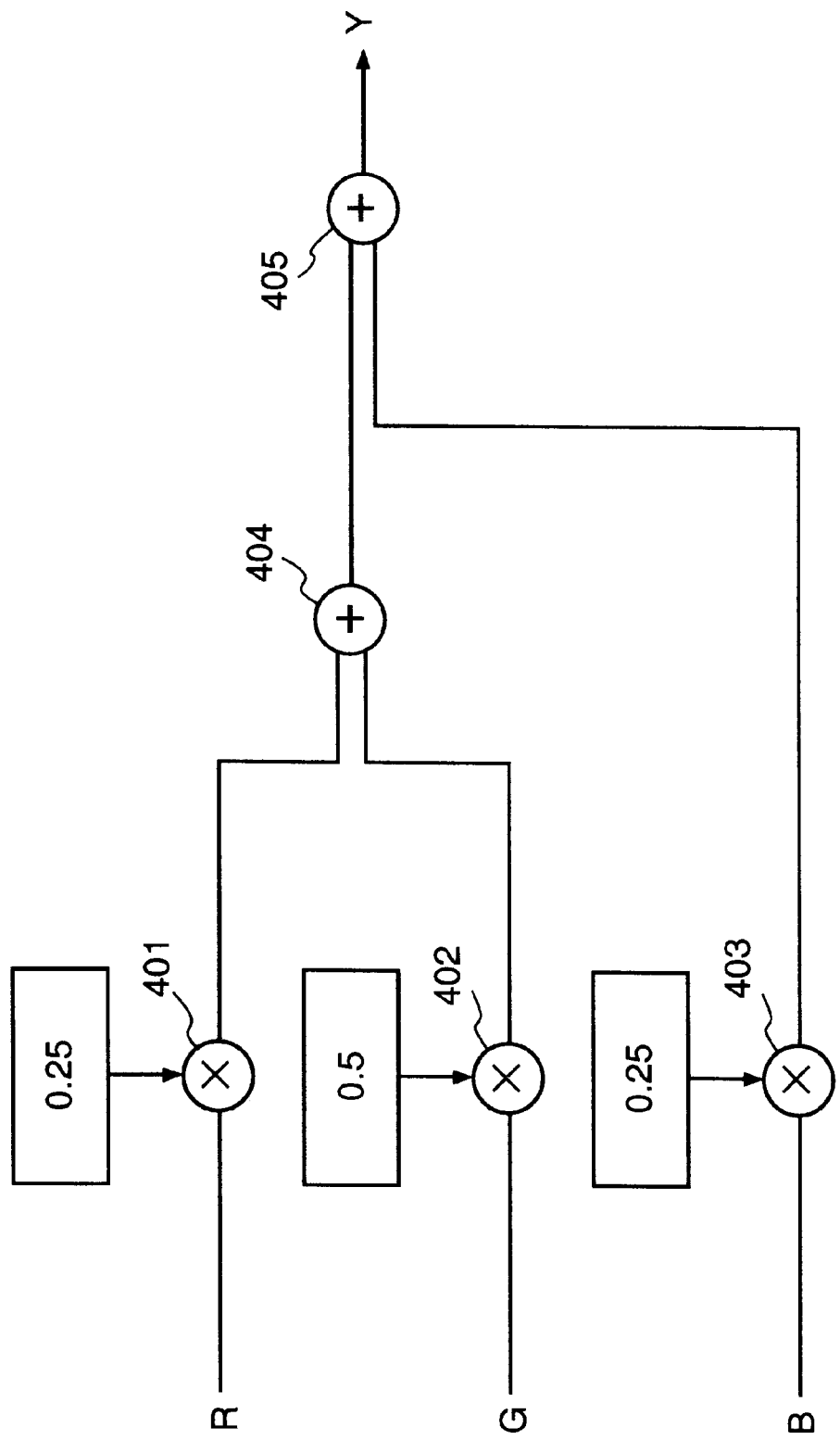
FIG. 4 is a block diagram showing an example of the details of construction of a luminance calculating circuit illustrated in FIG. 3.

FIG. 4 is a block diagram showing an example of the details of construction of the luminance calculating circuit 250. Here the input signals R, G, B are multiplied by coefficients in multipliers 401, 402, 403, respectively. The products from the multipliers 401, 402 are summed by an adder 404, and the output of the adder 404 and the product from the multiplier 403 are summed by an adder 405. The output of the adder 405 is the luminance signal Y.

The luminance signal Y from the luminance calculating circuit 250 is applied to an edge-min direction detecting circuit in FIG. 3. The direction in which the absolute value of an edge quantity takes on the minimum value is obtained by the circuit 251. This direction shall be referred to as the "edge-min direction" below.

Figure 5:
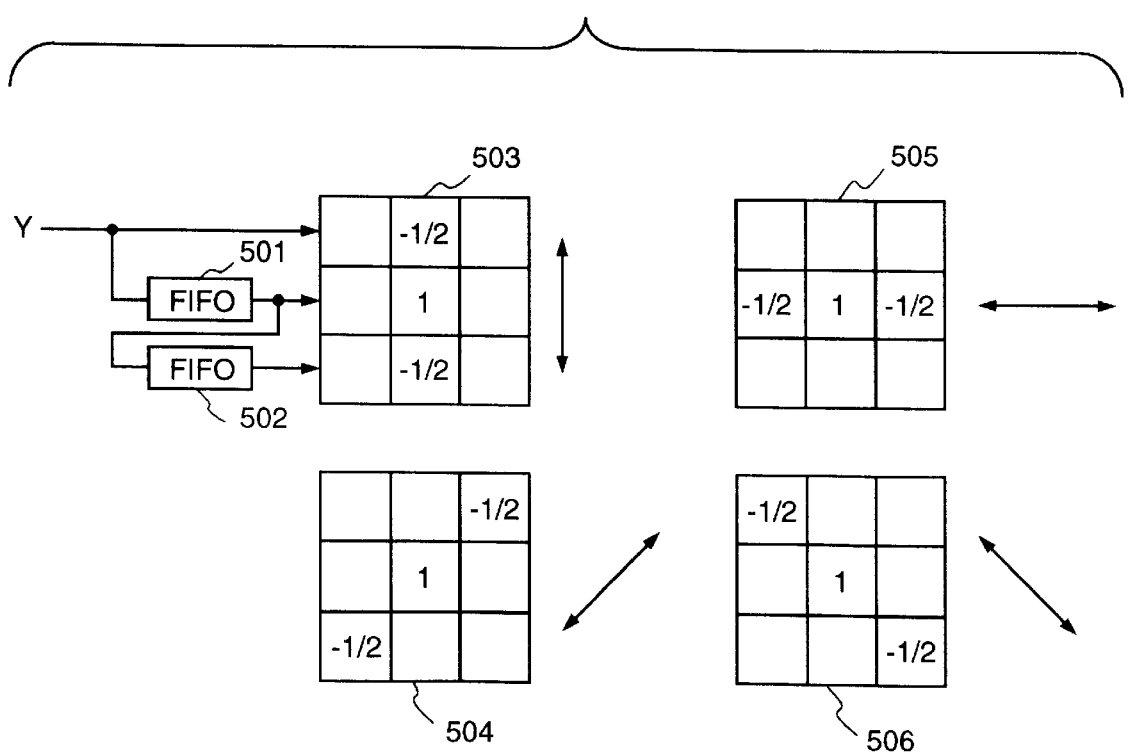
FIG. 5 is a diagram for describing an edge-min direction detecting circuit shown in FIG. 3.

FIG. 5 is a diagram for describing the edge-min direction detecting circuit 251. The input luminance signal Y is delayed line by line by FIFOs 501, 502 and well-known Laplacian filtering is applied is blocks of 3×3 pixels. Laplacian filters 503~506 are filters for the longitudinal direction, diagonal direction, transverse direction and diagonal direction, respectively, as illustrated. The output values of these filters for the four directions are edge quantities. The direction in which an absolute value takes on the minimum value is obtained and this direction is adopted as the edge-min direction.

With reference again to FIG. 3, an edge-min direction smoothing circuit 252 applies smoothing processing to the edge-min direction obtained. By virtue of this processing, only the direction in which the edge component is largest is preserved and the other directions are smoothened. More specifically, as for a screened dot component where the edge component is large with respect to a plurality of directions, the edge component is smoothened and therefore the feature thereof is diminished. On the other hand, the features of characters or fine lines where an edge component exists in only one direction is preserved. By repeating this processing as necessary, the separation of line components and screened dot components is performed more and more effectively and it becomes possible to sense character components present in screened dot areas. These character components cannot be sensed with an ordinary edge detecting method.

An edge detecting circuit 253 subjects the results of smoothing to the above-mentioned Laplacian filtering to eliminate pixels for which the absolute value of the edge quantity is less than a predetermined value a. More specifically, the edge detecting circuit 253 outputs an edge detection signal in which a pixel value for which the absolute value is less than a is made "0" whereas a pixel value for which the absolute value is greater than a is made "1".

Figure 6A:
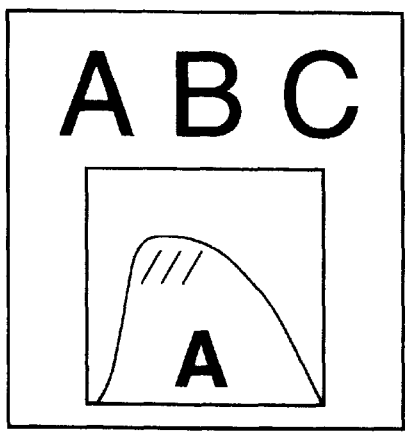
FIGS. 6A and 6B are diagrams illustrating examples of an image based upon an edge detection signal.
Figure 6B:
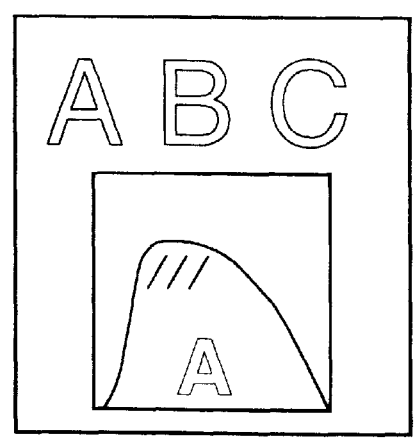

An image based upon the edge detection signal thus obtained is shown in FIGS. 6A and 6B, by way of example. FIG. 6A shows an image in accordance with the luminance signal Y, and FIG. 6B illustrates an image in accordance with the edge detection signal.

The edge discriminator 114 outputs a signal "edge", in which five items, namely signals obtained by expanding the aforesaid discrimination signals at block sizes of 7×7, 5×5, 3×3, "no expansion" and "no edge", are represented by codes of three bits. The term "expansion" of a signal means taking the OR of the signal values of all pixels within the block.

[Discrimination of Saturation]

In FIG. 2, the image signal from the input masking unit 104 is applied to a saturation discriminator 115, which has a construction of the kind exemplified in FIG. 7. The discriminator 115 discriminates the saturation of the image.

As shown in FIG. 7, a maximum-value detecting circuit 701 and a minimum-value detecting circuit 702 extract a maximum value Max(R,G,B) and a minimum value Min(R,G,B) of the input RGB signal. A subtractor 703 outputs ΔC, which is the difference between Max(R,G,B) and Min(R,G,B). A LUT (look-up table) 704 converts the output ΔC of the subtractor 703 and produces a saturation signal Cr in accordance with a characteristic of the kind shown in FIG. 8.

Figure 8:
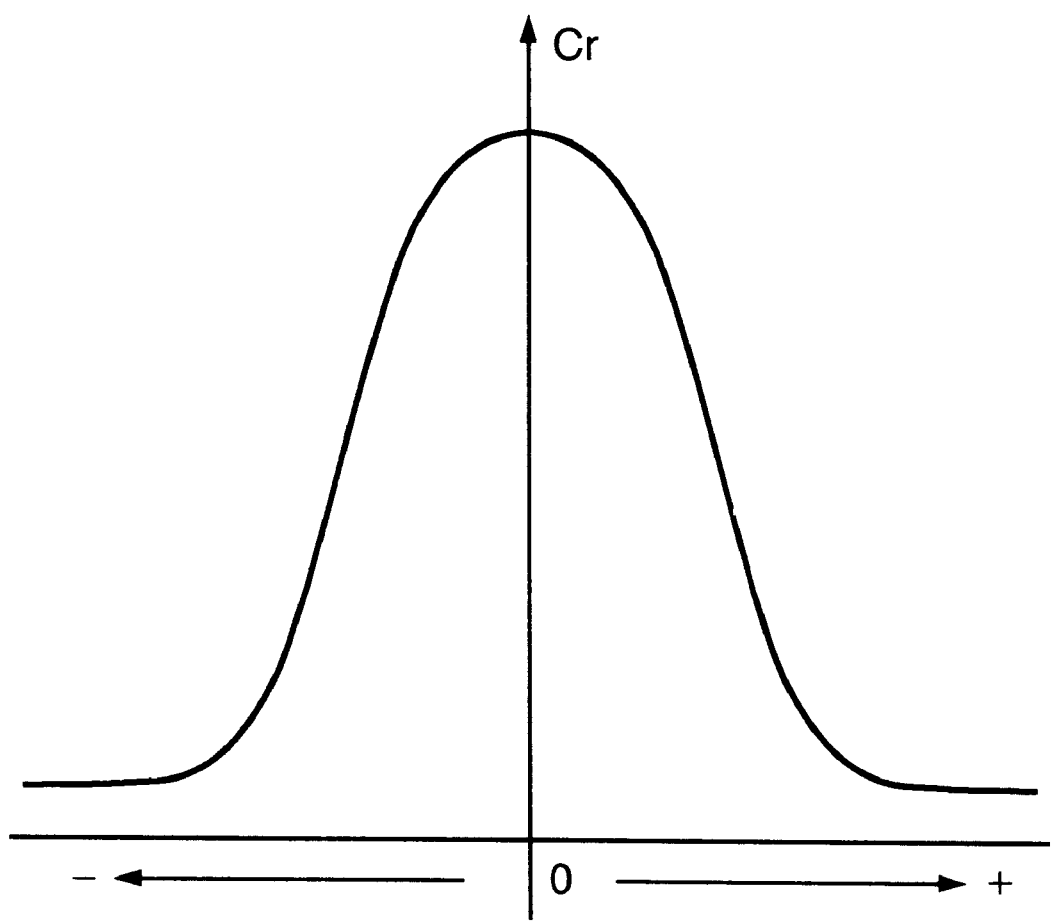
FIG. 8 is a diagram showing an example of the characteristic of a LUT shown in FIG. 7.

FIG. 8 shows that the closer ΔC is to zero, the lower the saturation (the nearer the achromatic state), and that the larger ΔC becomes, the higher the degree of chromaticity.

Accordingly, on the basis of the characteristic of FIG. 8, the higher the degree of achromatic color, the larger the value of Cr; the higher the degree of chromatic color, the closer the approach to zero.

The saturation discriminator 115 outputs a signal "col", which represents color (the chromatic color), black, intermediate and white in the form of a two-bit code.

Here the term "intermediate" means a color whose saturation is middle. In other words, in a case where a value of image signal is divided into a value of the chromatic color and that of the achromatic color by providing two different threshold values, the value of image signal which represents an "intermediate" color includes neither the chromatic color nor the achromatic color.

[Discrimination of Character Thickness]

Figure 9:
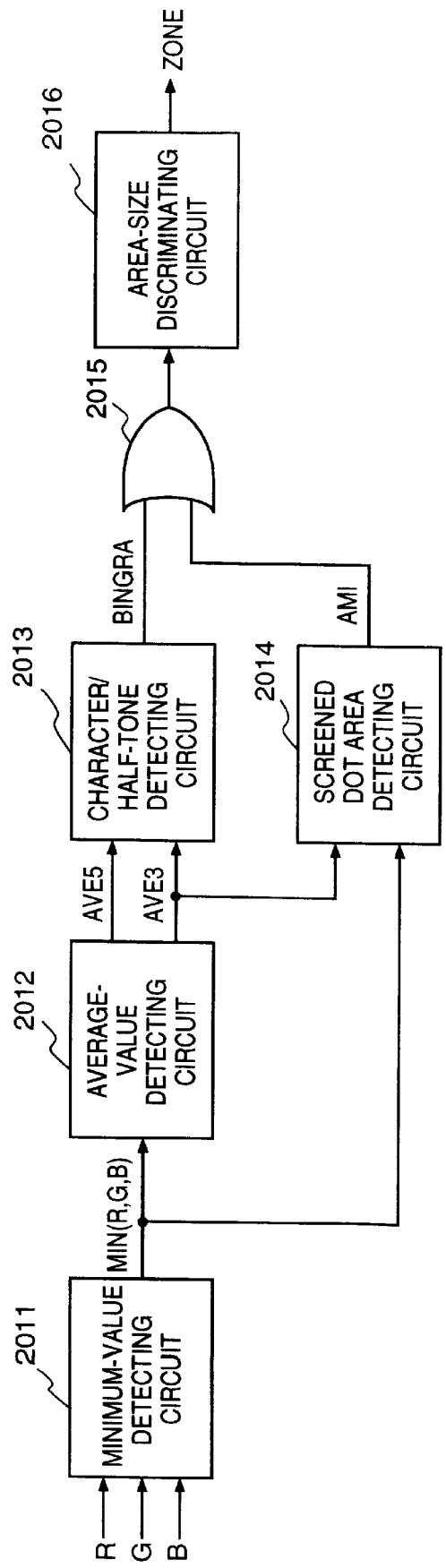
FIG. 9 is a block diagram showing an example of the construction of a character thickness discriminator shown in FIG. 2.

Numeral 113 in FIG. 2 denotes a character thickness discriminator having a construction of the kind exemplified in FIG. 9 The discriminator 113 receives the image signal from the input masking unit 104 as an input and discriminates the character thickness.

As shown in FIG. 9, the character thickness discriminator includes a minimum-value detecting circuit 2011 for detecting the minimum value Min(R,G,B) of the input RGB signal. The signal Min(R,G,B) enters an average-value detecting circuit 2012, which obtains the average value AVE5 of Min(R,G,B) of 5×5 pixels neighboring a pixel of interest as well as the average value AVE3 of Min(R,G,B) of 3×3 pixels neighboring a pixel of interest. A character/halftone detecting circuit 2013 receives the signals AVE5, AVE3 as inputs and detects the density of the pixel of interest and the amount of change in the average density of the pixel of interest and neighbors, thereby determining whether the pixel of interest is part of a character or part of a half-tone zone.

Figure 10:
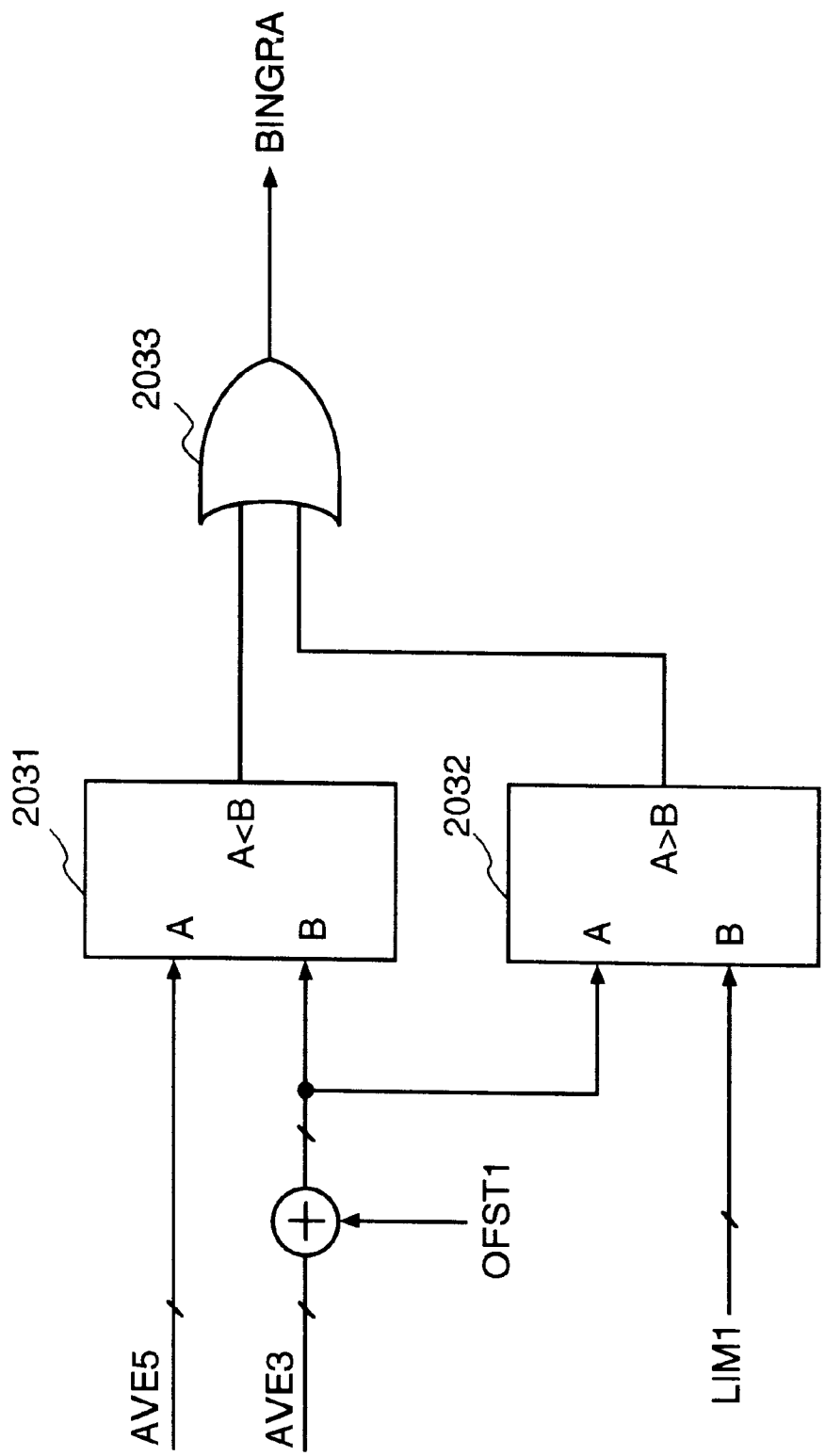
FIG. 10 is a block diagram illustrating an example of the construction of a character/half-tone detecting circuit shown in FIG. 9.

FIG. 10 is a block diagram illustrating an example of the construction of the character/half-tone detecting circuit 2013. First, a suitable offset value OFST1 is added to AVE3, after which AVE3+OFST1 is compared with AVE5 by a comparator 2031. Further, a comparator 2032 compares AVE3+OFST1 with a suitable limit value LIM1. The outputs of the comparators 2031, 2032 enter an OR gate 2033. More specifically, the output BINGRA of the character/half-tone detecting circuit 2013 becomes "1" under the following condition:

$$AVE3+OFST1>AVE5 \tag{2}$$

or $$AVE3+OFST1>LIM1 \tag{3}$$

By virtue of this circuit, the character/half-tone zone signal BINGRA becomes "1" if there is a change in density in the vicinity of the pixel of interest (i.e., in case of the edge portion of a character) or if the vicinity of the pixel of interest possesses a density greater than a certain value (i.e., in case of the interior of a character or a half-tone portion).

Figure 11:
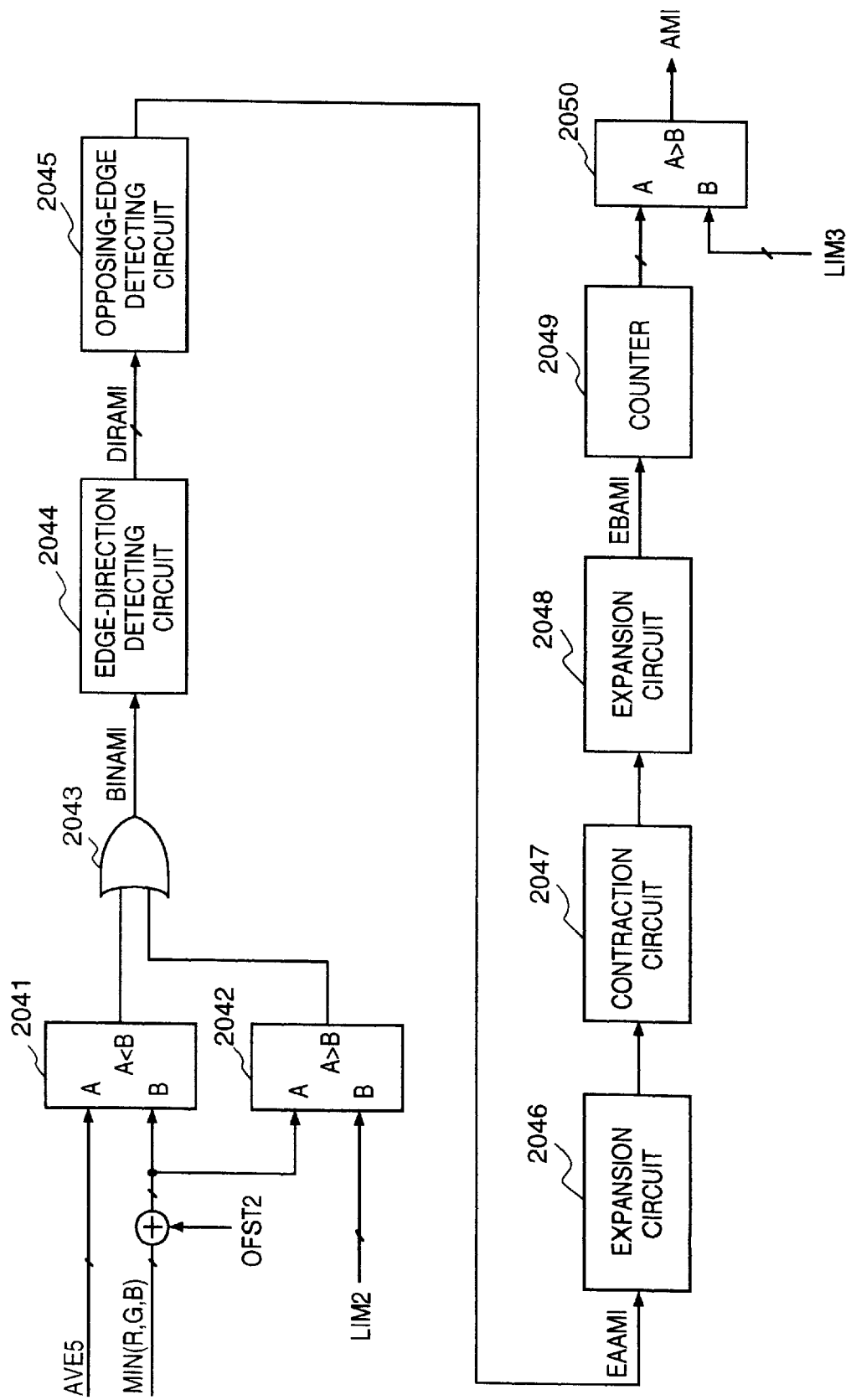
FIG. 11 is a block diagram illustrating an example of the construction of a screened dot area detecting circuit shown in FIG. 9.

With reference again to FIG. 9, numeral 2014 denotes a screened dot area detecting circuit having a construction of the kind exemplified in FIG. 11. First, a suitable offset value OFST2 is added to Min(R,G,B), after which Min(R,G,B)+OFST2 is compared with AVE5 by a comparator 2014. Further, a comparator 2042 compares Min(R,G,B) with a suitable limit value LIM2. The outputs of the comparators 2014, 2042 enter an OR gate 2043. More specifically, the output BINAMI of the OR gate 2043 becomes "1" under the following condition:

$$\text{Min}(R,G,B)+\text{OFST2}>\text{AVE5} \quad (4)$$

or $$\text{Min}(R,G,B)+\text{OFST2}>\text{LIM2} \quad (5)$$

The signal BINAMI enters a edge-direction detecting circuit 2044, which proceeds to obtain the direction of an edge pixel by pixel.

Figure 12:
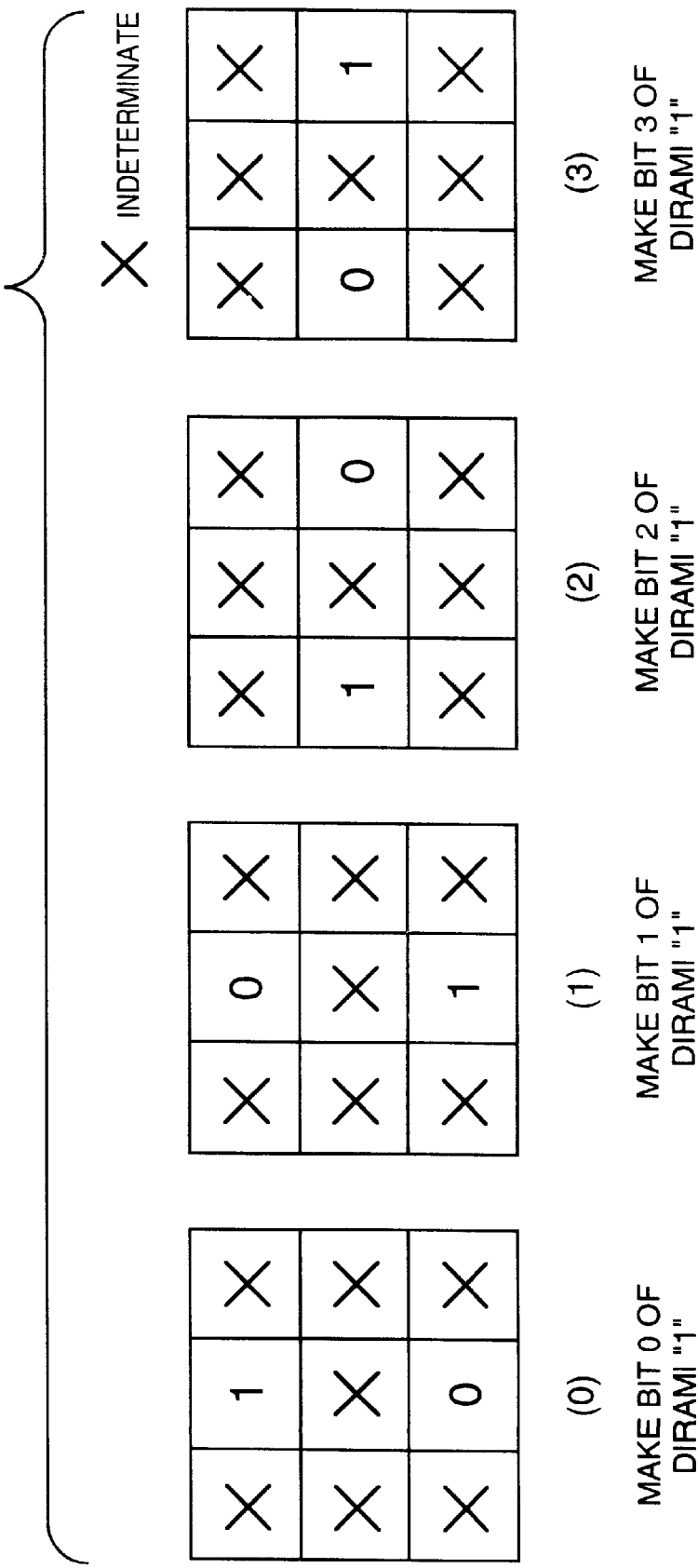
FIG. 12 is a diagram illustrating examples of edge-direction detecting rules in an edge-direction detecting circuit shown in FIG. 11.

FIG. 12 is a diagram illustrating examples of edge-direction detecting rules in the edge-direction detecting circuit 2044. In a case where four pixels which neighbor on the pixel of interest satisfy any of the conditions shown at (0)~(3) in FIG. 12, any one of bits 0~3 of the edge-direction signal DIRAMI is made "1". For example, let the pixels above, below, to the left and to the right of the pixel of interest be an upper pixel, a lower pixel, a left pixel and a right pixel, respectively. The condition (0) is such that bit 0 of the signal DIRAMI is made "1" when the upper pixel is "1" and the lower pixel is "0"; the condition (1) is such that bit 1 of the signal DIRAMI is made "1" when the upper pixel is "0" and the lower pixel is "1"; the condition (2) is such that bit 2 of the signal DIRAMI is made "1" when the left pixel is "1" and the right pixel is "0"; and the condition (3) is such that bit 3 of the signal DIRAMI is made "1" when the left pixel is "0" and the right pixel is "1".

The signal DIRAMI enters an opposing-edge detecting circuit 2045, which proceeds to detect mutually opposing edges within a zone of 5×5 pixels surrounding the pixel of interest. In coordinates in which the signal DIRAMI of the pixel of interest shown in FIG. 13 is represented by A33, rules for detecting opposing edges are as shown below. Specifically, in a case where any one of the conditions (1)~(4) below is satisfied, the opposing-edge detecting circuit 2045 raises is output signal EAAMI to logical "1".

(1) Bit 0 of any one of A11, A21, A31, A41, A51, A22, A32, A42, A33 is "1" and bit 1 of any of A33, A24, A34, A44, A15, A25, A35, A45, A55 is "1";

(2) bit 1 of any one of A11, A21, A31, A41, A51, A22, A32, A42, A33 is "1" and bit 0 of any of A33, A24, A34, A44, A15, A25, A35, A45, A55 is "1";

(3) bit 2 of any one of A11, A21, A31, A41, A51, A22, A32, A42, A33 is "1" and bit 3 of any of A33, A24, A34, A44, A15, A25, A35, A45, A55 is "1"; and (4) bit 3 of any one of A11, A21, A31, A41, A51, A22, A32, A42, A33 is "1" and bit 2 of any of A33, A24, A34, A44, A15, A25, A35, A45, A55 is "1".

Next, an expansion circuit 2046 subjects the signal EAAMI to an expansion of 3×4 pixels and, if the 3×4 pixels neighboring the pixel of interest have a pixel for which EAAMI is "1", raises EAAMI of the pixel of interest to "1". Furthermore, a contraction circuit 2047 and an expansion circuit 2048 are used to eliminate isolated results of detection in the zone of 5×5 pixels, thereby obtaining an output signal EBAMI. Here the term "contraction" means "1" is outputted when all of the input signals are "1".

Next, a counter 2049 counts the number of pixels for which the signal EBAMI is "1" in a window of a suitable size, namely a zone of 5×64 pixels inclusive of the pixel of interest.

Figure 14:
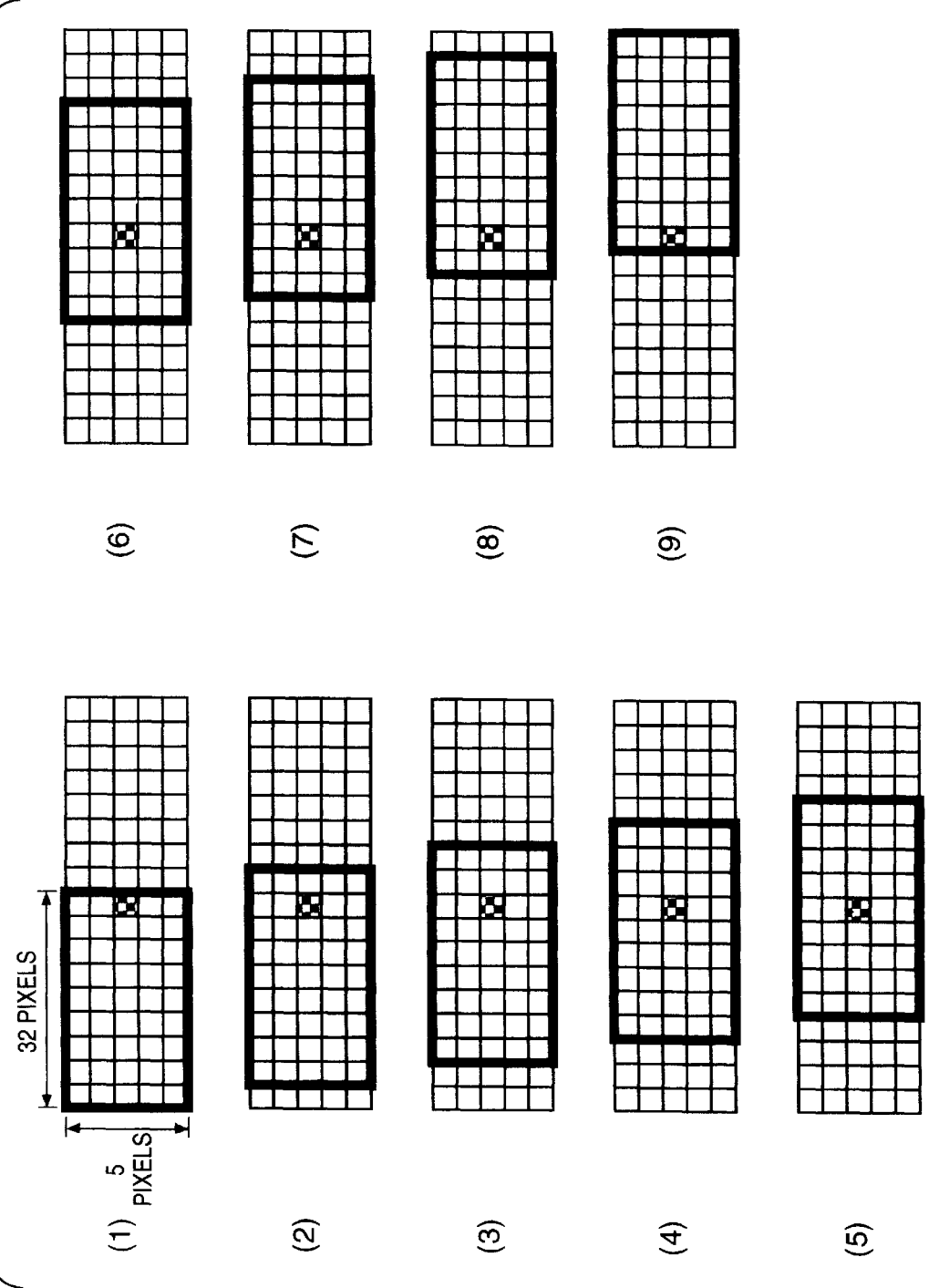
FIG. 14 is a diagram showing an example of a window in which a counter in FIG. 11 counts a signal EBAMI.

FIG. 14 is a diagram showing an example of the window. There are a total of 45 sampling points within the window, namely nine dots every four pixels in the main-scan direction and five lines of these dots in the sub-scan direction. Nine windows (1)~(9) shown in FIG. 14 are prepared by moving this window in the main-scan direction with respect to one pixel of interest. That is, reference is made to a zone of 5×64 pixels centered on the pixel of interest.

A comparator 2050 raises a screened dot area signal AMI to "1" if the result of counting EBAMI in the respective window by means of the counter 2049 has exceeded a suitable threshold value LIM3.

By virtue of the processing by the screened dot area detecting circuit 2014, a dot image detected as a group of isolated points can be detected as a zone signal using the signal BINGRA.

The thus obtained character/half-tone zone signal BINGRA and screened dot area signal AMI are OR-ed by an OR gate 2015, whereby a binarized signal PICT of the input image is produced.

The group of isolated dots will now be described in simple terms. The discrimination of image zone described above is carried out with regard to a binary image obtained by binarizing an image at a certain density. However, when a screened dot image is simply binarized, an assemblage of fine points resulting from dots which are the structural elements of the screened dot image is produced. Whether a dot is a screened dot image is discriminated by determining whether there are isolated points in a zone having a certain area. More specifically, in a case where there are a considerable number of dots in a certain zone, it is decided that this zone is a screened dot image. Further, in a case where the pixel of interest is part of a dot but there are no dots present in the periphery thereof, it is decided that the pixel of interest is part of a character or the like.

Figure 15:
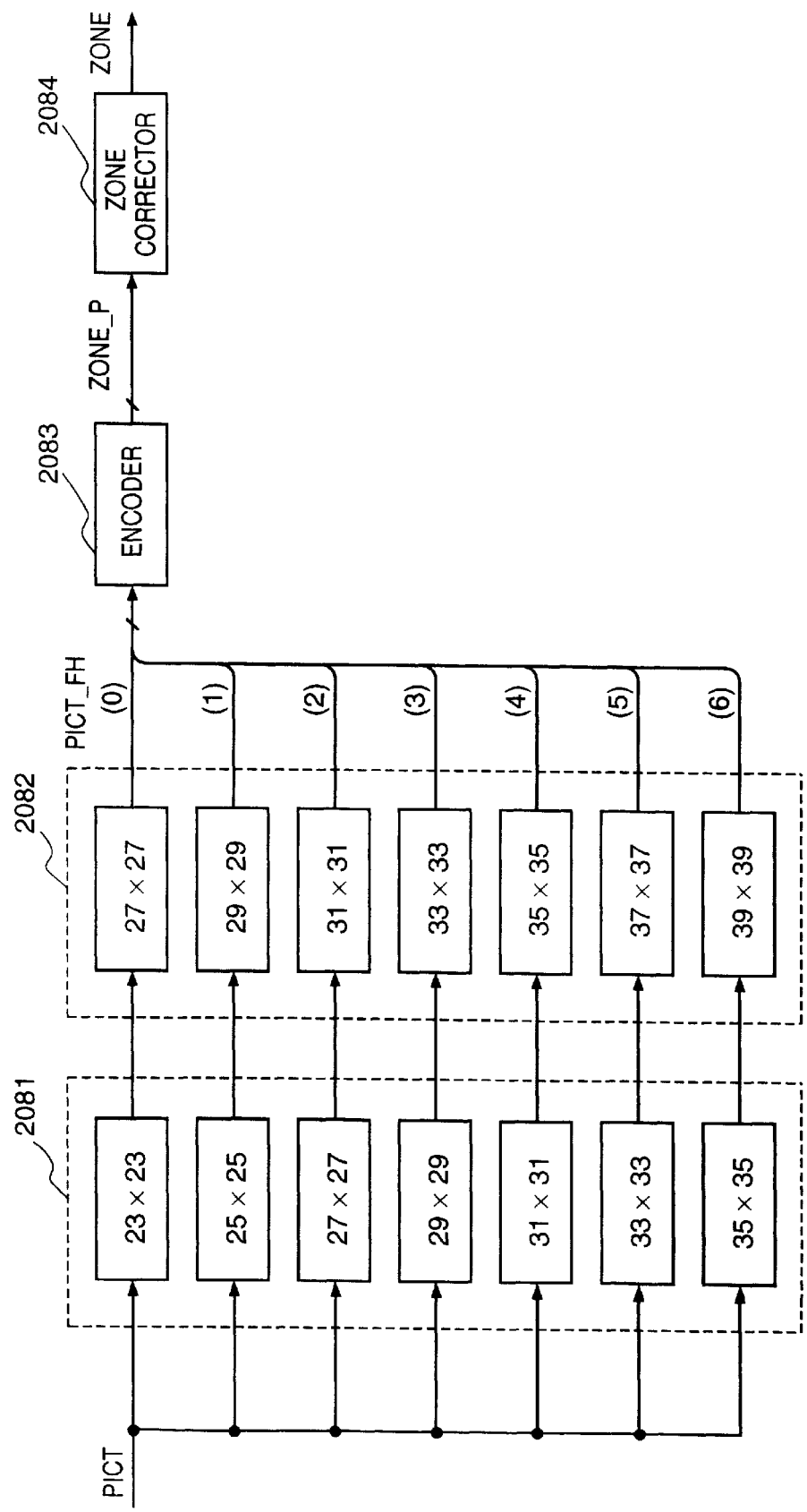
FIG. 15 is a block diagram illustrating an example of the construction of an area-size discriminating circuit shown in FIG. 9.

In FIG. 9, numeral 2016 denotes an area-size discriminating circuit having a construction of the kind exemplified in FIG. 15. The binarized signal PICT is entered into the discriminating circuit 2106, which then proceeds to determine the area size.

As shown in FIG. 15, the area-size discriminating circuit 2016 has a plurality of contraction circuits 2081 and a plurality of expansion circuits 2082. The sizes of the zones referred to are different. The signal PICT is subjected to a line delay in conformity with the size of the contraction circuit, after which the signal enters the contraction circuits 2081. In this embodiment, seven types of contraction circuits are prepared from a size of 23×23 pixels to a size of 35×35 pixels. The outputs of the group of contraction circuits 2081 enter the group of expansion circuits 2082 upon being subjected to a line delay. In this embodiment, seven types of expansion circuits from a size of 27×27 pixels to a size of 39×39 pixels are provided to correspond to the seven outputs from the contraction circuits. As a result, an output signal PICT_FH is obtained from each expansion circuit.

Figure 16:
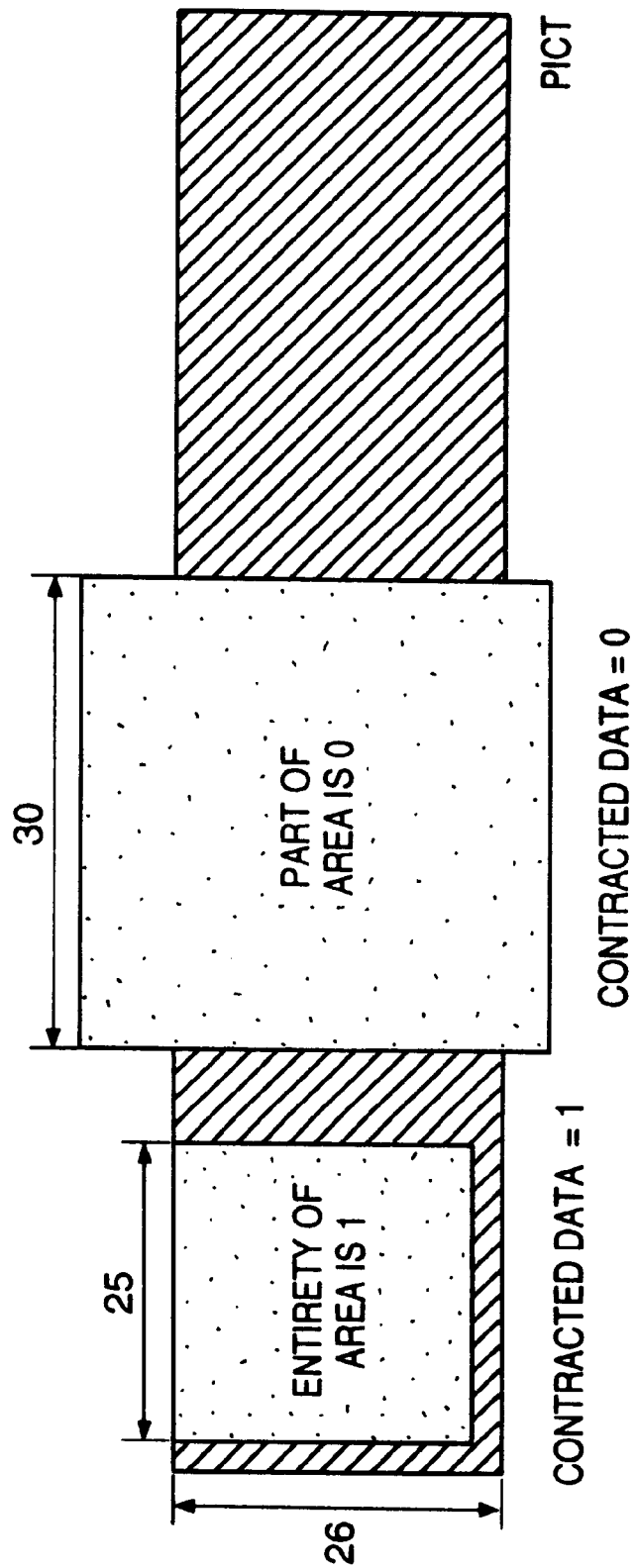
FIG. 16 is a diagram for illustrating the manner in which the value of a signal PICT_FH is decided by the thickness of a character.

In a case where the pixel of interest is part of a character, the value of the signal PICT_FH is decided by the thickness of this character. This is shown in FIG. 16. For example, in a case where the signal PICT is present in the form of a strip having a width of 26 pixels, the expanded outputs obtained after contraction of a size larger than 27×27 all become "0". When expansion conforming to the respective sizes is performed after contraction of a size smaller than 25×25 is carried out, strip-shaped output signals PICT_FH of 30-pixel width are obtained. By entering these signals into an encoder 2083, an image-zone signal ZONE_P to which the pixel of interest belongs is obtained.

FIG. 17 is a diagram illustrating an example of an encoding rule in the encoder 2083. The signal ZONE_P is made a three-bit signal and the thickness of a character or the like is represented by eight stages. Accordingly, ZONE_P=0 holds for the most slender characters or the like, and ZONE_P=7 holds for the thickest characters (inclusive of zones other than characters) or the like. By virtue of this processing, the signal ZONE_P of a photographic image or screened dot image for which the signal PICT is "1" is defined as 7 (maximum value) in a broad area, and a character or line image for which the area size is smaller than the maximum value has a value of the signal ZONE_P defined in dependence upon the size (thickness) of the character or line image.

Figure 18:
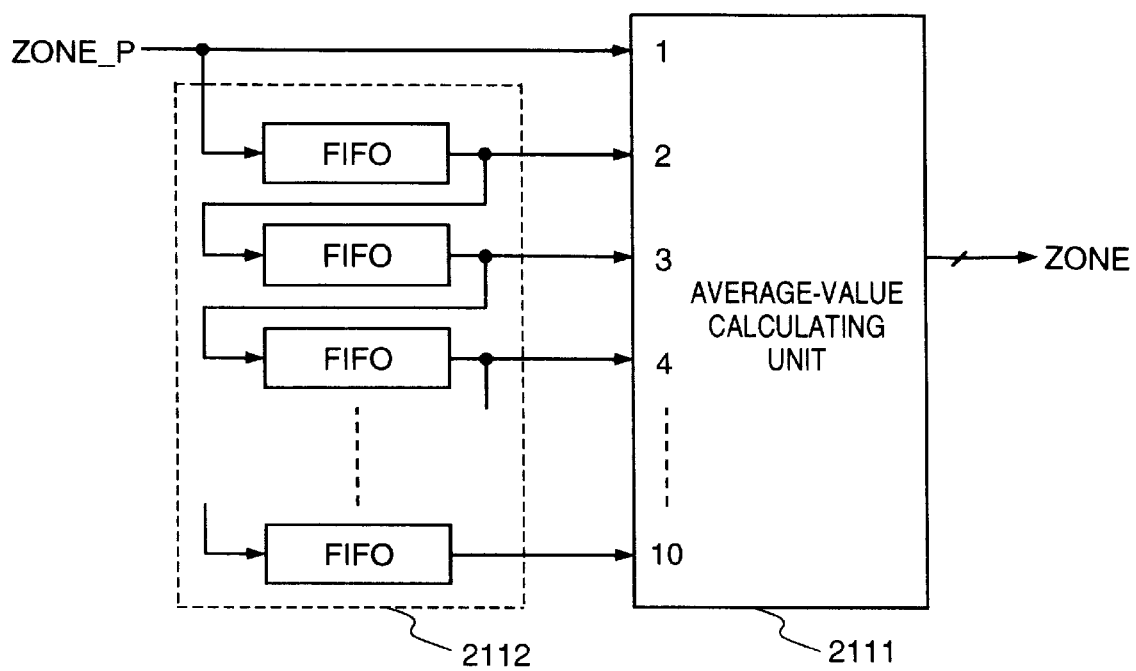
FIG. 18 is a block diagram showing an example of the construction of a ZONE corrector depicted in FIG. 15.

The signal ZONE_P that has entered a ZONE corrector 2084, an example of which is shown in FIG. 18, is subjected to a line delay by a line delay unit 2112 having a plurality of FIFOs, after which the signal enters an average-value calculating unit 2111, which calculates the average value of ZONE_P of, say, 10×10 pixels. The thicker the character, the larger the value of the signal ZONE_P; the finer the character, the smaller the value of ZONE_P. Therefore, the output of the average-value calculating unit 2111 becomes a corrected ZONE signal per se. It is preferred that the block size used in this correction be decided in conformity with a block size for judging the thickness of a character.

By performing subsequent processing using the corrected ZONE signal, discrimination of thickness varies smoothly even at portions where the character or line thickness changes abruptly. This makes it possible to reduce the decline in image quality caused by a change in black-character processing.

An area in which ZONE=7 holds can be regarded as a half-tone zone, as mentioned earlier. By making use of this, a character or line present in a screened dot or half-tone zone can be distinguished from a character or line of another area based upon the signal ZONE and edge signal. This method will be described below.

Figure 19:
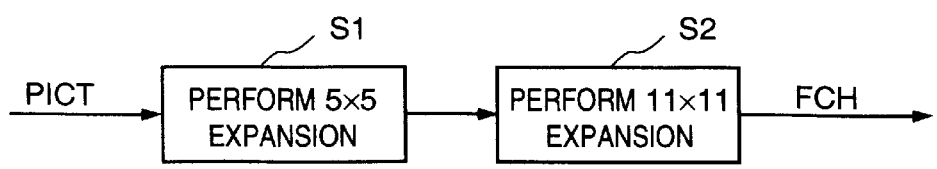
FIGS. 19 and 20 are diagrams for describing an example of an algorithm for detecting a character contained in a screened dot/half-tone area.
Figure 20:
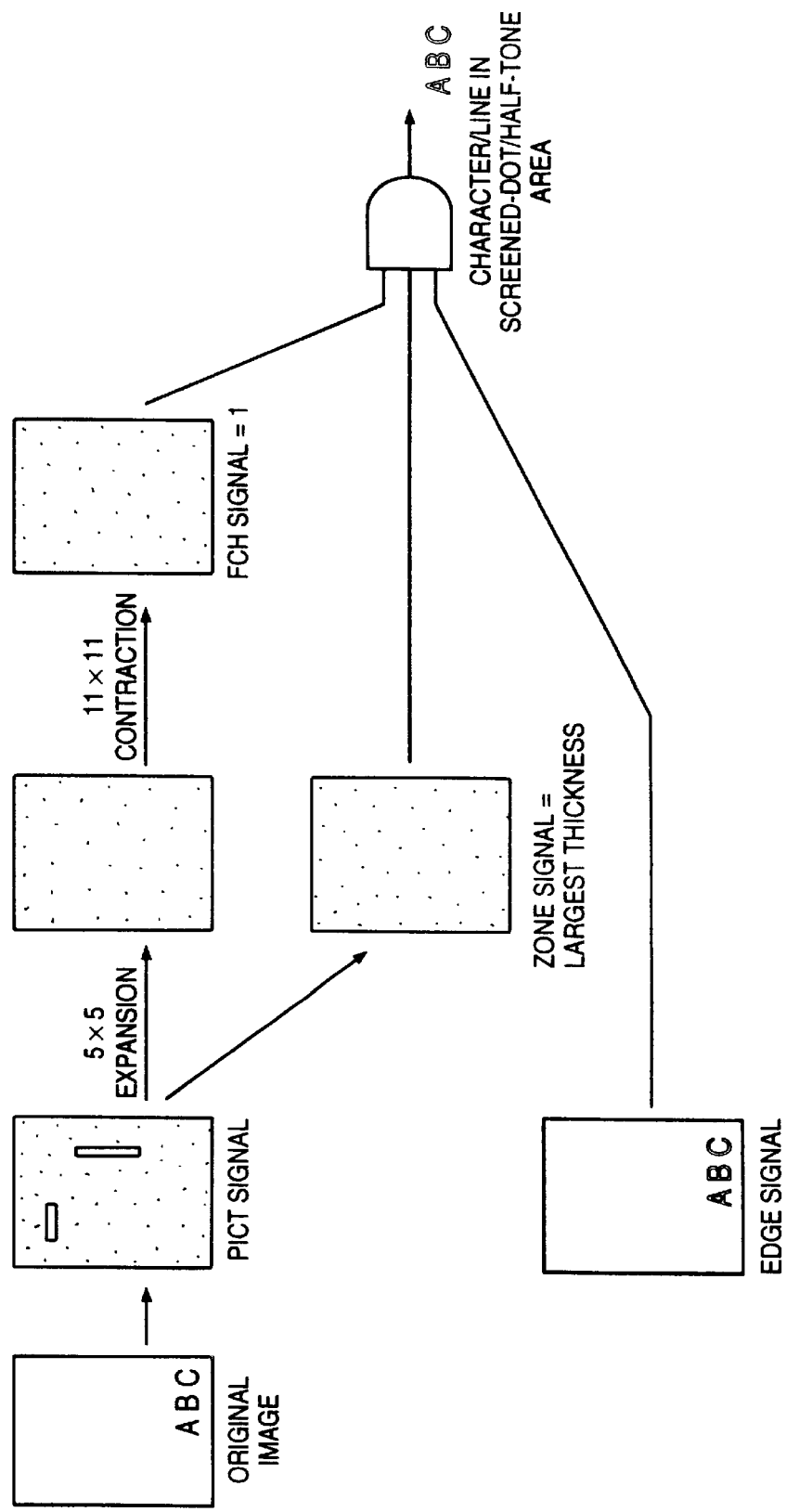

FIGS. 19 and 20 are diagrams for describing an example of an algorithm for detecting a character contained in a screened dot/half-tone area.

First, at step S1 in FIG. 19, the aforesaid signal PICT is subjected to 5×5 block expansion processing. As a result of this processing, a detection zone is corrected with regard to a screened dot area in which incomplete detection tends to occur. Next, at step S2, this output signal is subjected to contraction processing of an 11×11 block. A signal FCH obtained as the result of these processing steps is a signal which is the result of applying a contract of three pixels to the signal PICT.

As shown in FIG. 20, the edge in a white area and the edge of a screened dot/half-tone area can be distinguished from each other by combining the signal FCH, the signal ZONE and the edge signal. Black-character processing can be executed without emphasizing screened dot components, even in a screened dot image, and without processing portions, such as the borders of photographs, at which black-character processing is unnecessary.

[Encoding of Discrimination Signal]

Numeral 116 in FIG. 2 denotes an encoder, to which the discrimination signals ZONE, edge and col are applied, for outputting black-character discrimination signals UCR, FILTER and SEN in accordance with the table exemplified in FIG. 21. These signals are signals for controlling a masking UCR coefficient, a spatial filter coefficient and printer resolution. The values of these signals and their meanings are as follows:

SEN:
0 200 lines
1 400 lines
FILTER:
0 smoothing
1 strong edge emphasis
2 medium edge emphasis
3 weak edge emphasis
UCR:
0 much black
1 :
2 :
: :
6 :
7 little black
col:
0 other than black
1 black
FCH:
0 border of image
1 not border of image The features of this table area as follows:

(1) Multivalued black-character processing is possible in conformity with the thickness a character or the like.

(2) Since a plurality of edge-zone ranges are provided, a black-character processing zone can be selected in conformity with the thickness of a character or the like. In this embodiment, the widest area is processed with regard to the finest characters.

(3) Black-character processing is executed by discriminating between the degree of processing of character edges and the degree of processing of character interiors, and a smooth change in the amount of black is implemented.

(4) A character in a screened dot/half-tone image is processed by distinguishing it from a character in a white area.

(5) The coefficients of spatial filters are changed with regard to a character edge, character interior and screened dot/half-tone image. Coefficients are changed in dependence upon thickness with regard to character edges as well.

(6) Printer resolution is changed only with regard to the finest characters.

(7) With regard to color characters, all are subjected to processing identical with that for black characters with the exception of the masking UCR coefficients.

It goes without saying that the invention is not limited to the processing of this embodiment. Various processing methods may be considered by applying a variety of combinations to input signals.

In FIG. 2, numerals 117a, 117b denote compressors for compressing signals FILTER, UCR, SEN outputted by the encoder 116. Though various methods are available for compression, here we will describe a method in which compression is performed in 4×4 pixel units in conformity with the compression of the image signal.

Figure 22A:
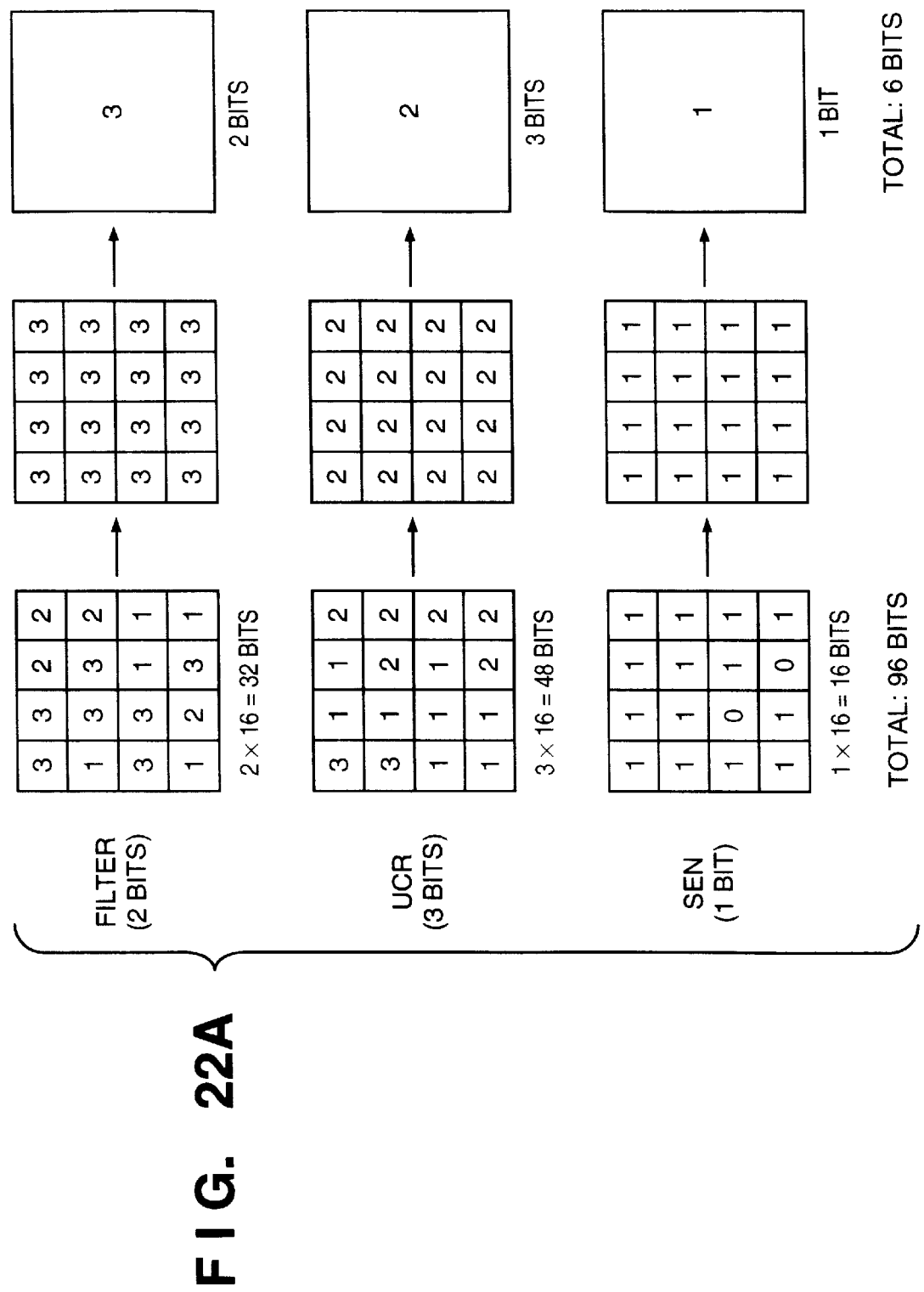
FIGS. 22A and 22B are diagrams showing examples of a compression method implemented by a compressor depicted in FIG. 2.

A method of compression, an example of which is shown in FIG. 22A, involves counting the numbers of codes in 4×4 blocks and adopting the code for which the number is highest as the representative value of the block. Accordingly, the rate of compression is $\frac{1}{16}$ (100 dpi). A black-character discrimination signal thus compressed from 96 to 6 bits per 16 pixels is stored in a memory 107.

Further, the signal SEN and the signal UCR are compressed in units of 4×4 pixels in conformity with compression of the image signal, and the signal FILTER for which a high resolution is required with respect to these two signals may be compressed in units of 2×2 pixels. It should be noted that block size is optional and that the block size may be different for each of the three signals.

Figure 22B:
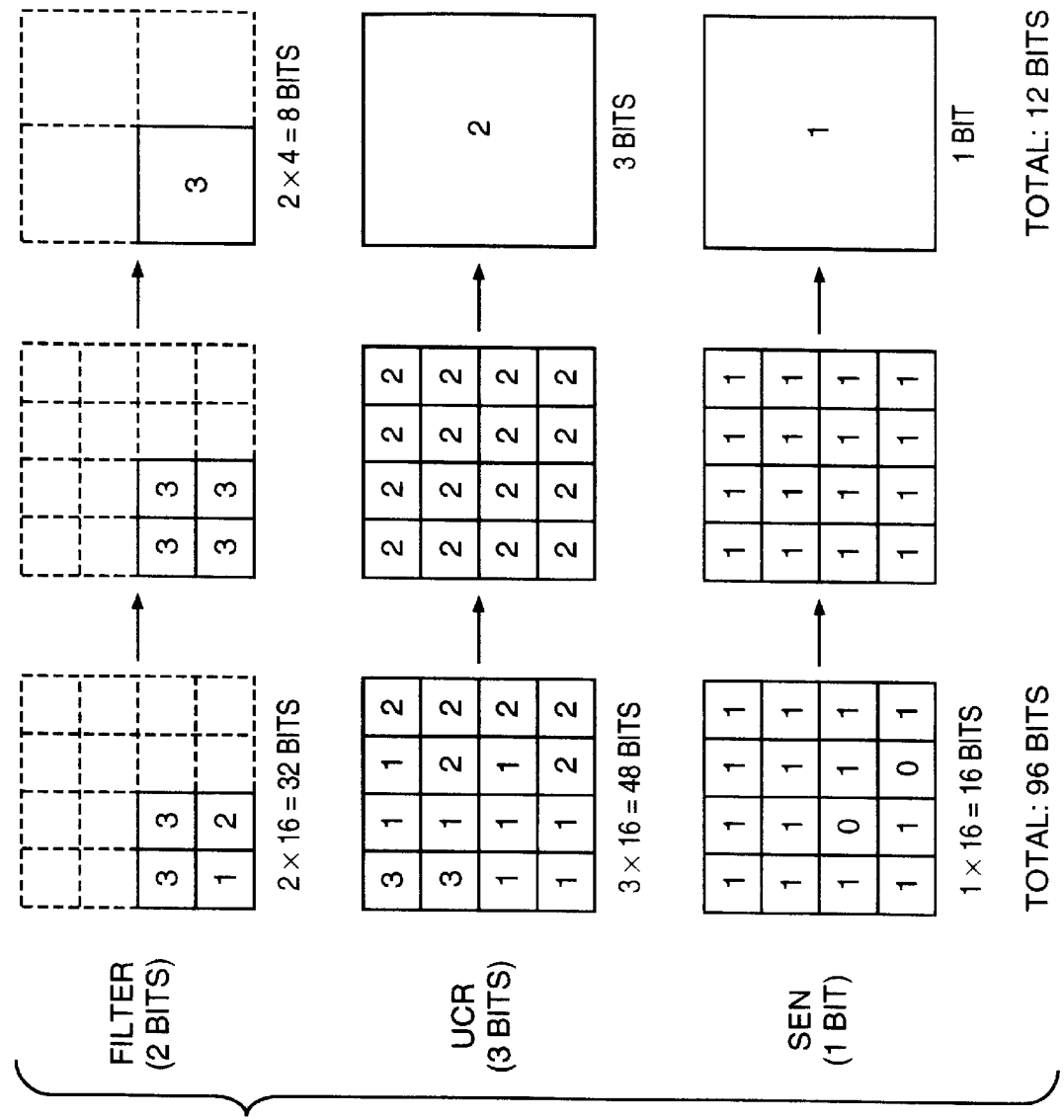

A method of compression, an example of which is shown in FIG. 22B, involves counting the numbers of codes in 2×2 or 4×4 blocks and adopting the code for which the number is highest as the representative value of the block. Accordingly, the rate of compression is ¼ (200 dpi) or 1/16 (100 dpi). A black-character discrimination signal thus compressed from 96 to 12 bits per 16 pixels is stored in a memory 107.

Numeral 118 in FIG. 2 denotes a decompressor for decompressing the black-character discrimination signal stored in the memory 107 and sending the signal UCR to the masking UCR unit 109, the signal FILTER to the spatial filter unit 111, and the signal SEN to a laser driver.

The masking UCR unit 109 generates a black signal K and executes output masking processing in conformity with the signal UCR. The minimum values of C, M, Y are obtained in accordance with the following equation:

$$\text{Min } CMY = \text{Min } (C, M, Y) \tag{6}$$

Next, the value of black K is obtained in accordance with Equation (7) shown in FIG. 23. A 4×8 masking operation is then performed in accordance with Equation (8) in FIG. 23 to output C, M, Y, K. In Equation (8), C1, M1, Y1 represent input signals, C2, M2, Y2, K2 represent output signals, m11~m84 are masking coefficients decided by the printer engine 112 used, and k11~k84 are UCR coefficients decided by the signal UCR.

Though all of the UCR coefficients are 1.0 with regard to the screened dot/half-tone image (for which the signal ZONE is 7), the UCR coefficients are set with regard to the finest character in such a manner that black color K is outputted. With regard to an intermediate thickness, the UCR coefficients are decided and the amount of K is controlled in such a manner that a change in color conforming to thickness takes place smoothly.

The spatial filter 111 uses two 5×5 filters, with the output from the first filter entering the second filter. As for the filter coefficients, (1) smoothing 1, (2) smoothing 2, (3) edge emphasis 1 and (4) edge emphasis 2 are prepared, and these coefficients are changed over every pixel by the signal FILTER. By using two filters, edge emphasis is performed after smoothing, thereby implementing edge emphasis with reduced moire. Further, by combining edge-emphasis coefficients of two types, it is possible to obtain an output of a highquality image.

Figure 24:
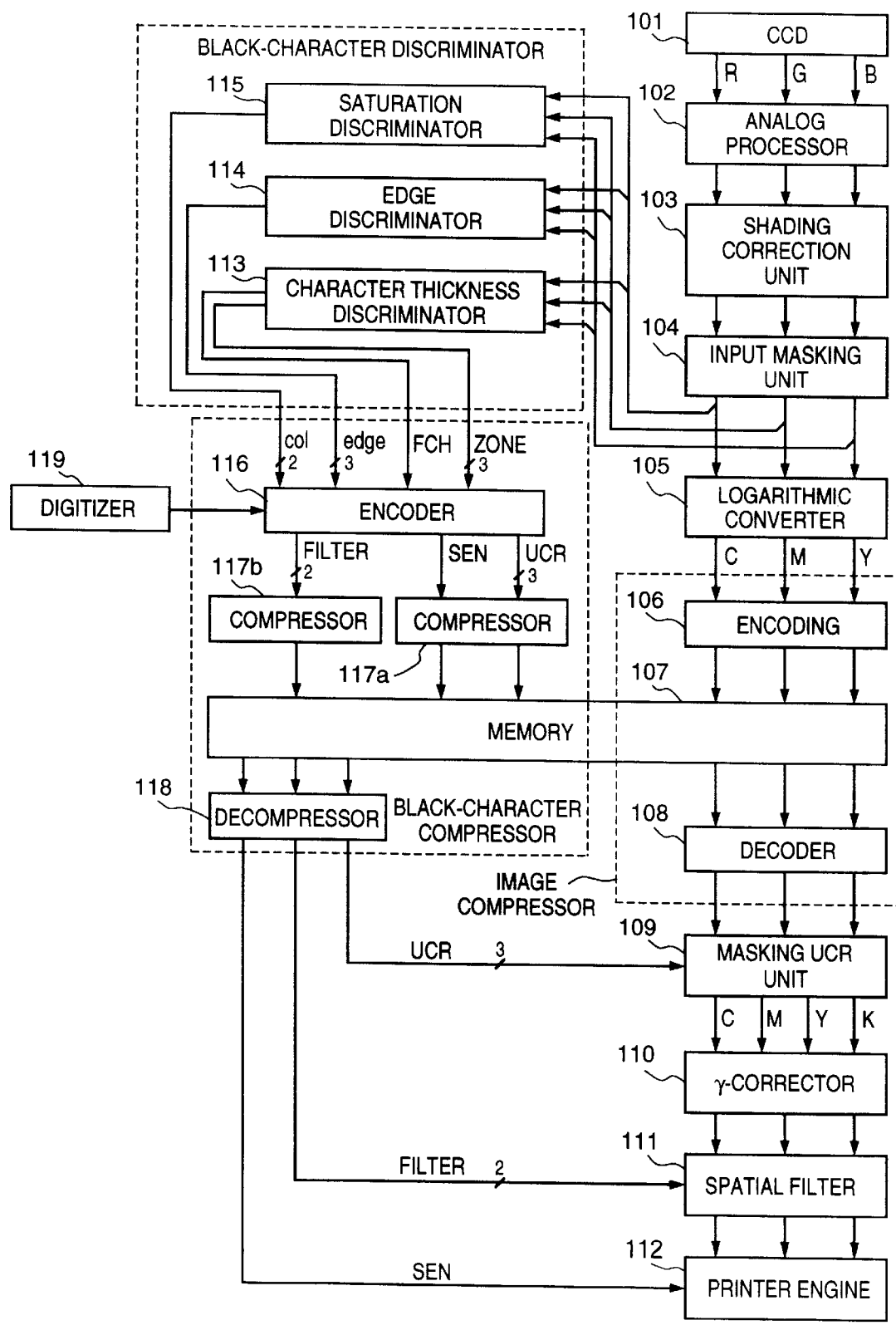
FIG. 24 shows an example in which a digitizer is connected to the present embodiment.

Operation in an ordinary reproduction mode has been described above. However, as shown for example in FIG. 24, the signal ZONE (e.g., 0 and 7) can be entered into the encoder 116 with the zone being designated by a digitizer 119. Subsequent processing is similar to that described above. Further, it goes without saying that the signal ZONE for designating the zone can be entered from external equipment such as a host computer via a general-purpose interface instead of the digitizer.

Thus, in accordance with this embodiment as described above, the discrimination signal of a black character or fine line is not compressed directly. Rather, after codes are obtained according to the type of image processing, the codes are compressed. As a result, the number of bits of the discrimination signal stored in memory can be reduced and it is possible to form black characters and fine lines at a high quality.

In accordance with the present invention, as described above, there can be provided an image processing apparatus and method in which results of discrimination are encoded and divided into blocks in conformity with the image processing, thereby reducing the amount of information stored in memory and preventing a decline in image quality.

The present invention can be applied to a system constituted by a plurality of devices such as an image scanner or printer or to an apparatus comprising a single device such as a color copying machine. Furthermore, it goes without saying that the invention is applicable also to a case where the object of the invention is attained by supplying a program, which has been stored on a floppy disk or the like, to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting image data;

processing means for processing the image data to output reproduction data;

extracting means for extracting a characteristic of the image data;

generating means for generating a control signal of said processing means based upon the characteristic of the image data;

compressing means for compressing the control signal;

storing means for storing the compressed control signal; and expanding means for expanding the compressed control signal stored in said storing means, wherein said processing means performs the processing by using the control signal expanded by said expanding means.

2. The apparatus according to claim 1, wherein said input means comprises an image reader for scanning an original and generating color image data.

3. The apparatus according to claim 1, wherein said processing means performs at least one of UCR processing, spatial filtering processing and plural-resolution processing.

4. The apparatus according to claim 1, wherein the characteristic is at least one of width of a line image an edge and a saturation.

5. The apparatus according to claim 1, wherein said generating means comprises a look-up table.

6. The apparatus according to claim 1, wherein the control signal is generated for each and every pixel.

7. The apparatus according to claim 1, wherein said compressing means performs compression in two-dimensional block units.

8. The apparatus according to claim 1, wherein said compressing means performs lossy compression.

9. The apparatus according to claim 1, further comprising encoding means for encoding the image data.

10. The apparatus according to claim 9, wherein said encoding means performs lossy compression.

11. The apparatus according to claim 9, wherein said encoding means performs encoding in two-dimensional block units.

12. The apparatus according to claim 11, wherein said compressing means performs compression in dependence upon the size of the two-dimensional blocks.

13. The apparatus according to claim 12, wherein the size of a block used by said encoding means and the size of a block used by said compressing means are the same.

14. The apparatus according to claim 1, further comprising image forming means for forming an image on a medium in dependence upon the reproduction data outputted by said processing means.

15. An image processing method comprising the steps of:
inputting image data;
processing the image data to output reproduction data by using a processing unit;
extracting a characteristic of the image data;
generating a control signal based upon the characteristic of the image data;
compressing the control signal;
storing the compressed control signal in a storing unit; and
expanding the compressed control signal stored in the storing unit,
wherein in said processing step, the processing is performed by using the control signal expanded in said expanding step.

16. The method according to claim 15, wherein the input image data is generated by an image reader for scanning an original and generating color image data.

17. The method according to claim 15, wherein said processing step includes performing at least one of UCR processing, spatial filtering processing and plural-resolution processing.

18. The method according to claim 15, wherein the characteristic is at least one of width of a line image, an edge and a saturation.

19. The method according to claim 15, wherein the control signal is generated using a look-up table.

20. The method according to claim 15, wherein the control signal is generated for each pixel.

21. The method according to claim 15, wherein, the control signal is compressed in two-dimensional block units.

22. The method according to claim 15, wherein, in said compressing step, lossy compression is performed.

23. The method according to claim 15, further comprising the step of forming an image on a medium in dependence upon the reproduction data obtained in said processing step.

24. The method according to claim 15, further comprising the step of encoding the image data.

25. The method according to claim 24, wherein said encoding step includes performing lossy compression.

26. The method according to claim 24, wherein said encoding step includes performing encoding in two-dimensional block units.

27. The method according to claim 26, wherein said compressing step includes performing compression in dependence upon the size of the two-dimensional blocks.

28. The method according to claim 27, wherein the size of a block used in said encoding step and the size of a block used in said compressing step are the same.

29. An image processing apparatus comprising:
input means for inputting image data;
a control signal generator that generates a control signal for use in image processing based upon the characteristic of the input image data;
a compressor arranged to receive and compress the control signal;
a memory for storing the compressed control signal and image data corresponding to the input image data;
a signal expander arranged to receive and expand the compressed control signal stored in the memory; and
a data processor that processes the image data stored in the memory and outputs reproduction data in accordance with the expanded control signal.

30. The apparatus according to claim 29, wherein said input means comprises an image reader for scanning an original and generating color image data.

31. The apparatus according to claim 29, wherein said data processor performs at least one of UCR processing, spatial filtering processing and plural-resolution processing.

32. The apparatus according to claim 29, wherein the characteristic is at least one of width of a line image, an edge and a saturation.

33. The apparatus according to claim 29, wherein said generator comprises a look-up table.

34. The apparatus according to claim 29, wherein the control signal is generated for each pixel.

35. The apparatus according to claim 29, wherein said compressor performs compression in two-dimensional block units.

36. The apparatus according to claim 29, wherein said compressor performs lossy compression.

37. The apparatus according to claim 29, further comprising an image former arranged to form an image on a medium in dependence upon the reproduction data outputted by said data processor.

38. The apparatus according to claim 29, further comprising an encoder, arranged to encode the input image data.

39. The apparatus according to claim 38, wherein said encoder performs encoding in two-dimensional block units.

40. The apparatus according to claim 39, wherein said compressor performs compression in dependence upon the size of the two-dimensional blocks.

41. The apparatus according to claim 40, wherein the size of a block used by said encoder and the size of a block used by said compressor are the same.

42. The apparatus according to claim 38, wherein said encoder performs lossy compression.

43. An image processing method comprising the steps of:
inputting image data;
generating a control signal for image processing based upon the characteristic of the input image data;
compressing the control signal;
storing the compressed control signal and image data corresponding to the input image data in a memory;
expanding the compressed control signal stored in the memory; and
processing the image data stored in the memory to output reproduction data in accordance with the expanded control signal.

44. The method according to claim 43, wherein the input image data is generated by an image reader for scanning an original and generating color image data.

45. The method according to claim 43, wherein said processing step includes performing at least one of UCR processing, spatial filtering processing and plural-resolution processing.

46. The method according to claim 43, wherein the characteristic is at least one of width of a line image, an edge and a saturation.

47. The method according to claim 43, wherein the control signal is generated using a look-up table.

48. The method according to claim 43, wherein the control signal is generated for each pixel.

49. The method according to claim 43, wherein the control signal is compressed in two-dimensional block units.

50. The method according to claim 43, wherein, in said compressing step, lossy compression is performed.

51. The method according to claim 43, further comprising the step of forming an image on a medium in dependence upon the reproduction data obtained in said processing step.

52. The method according to claim 43, further comprising the step of encoding the input image data.

53. The method according to claim 52, wherein said encoding step includes performing encoding in two-dimensional block units.

54. The method according to claim 53, wherein said compressing step includes performing compression in dependence upon the size of the two-dimensional blocks.

55. The method according to claim 54, wherein the size of a block used in said encoding step and the size of a block used in said compressing step are the same.

56. The method according to claim 52, wherein said encoding step includes performing lossy compression.

* * * * *

UNITED STATES PATENT AND TRADEMARK OFFICE
CERTIFICATE OF CORRECTION

PATENT NO. : 6,088,130
DATED : July 11, 2000
INVENTOR(S) : Yushi Matsukubo

It is certified that error appears in the above-identified patent and that said Letters Patent is hereby corrected as shown below:

Title page,
Item [56] Attorney, Agent or Firm, "Fitzpatrick Cella Harper & Scinto" should read -- Fitzpatrick, Cella, Harper & Scinto --.

Column 3,
Line 48, "have been" should read -- have --.

Column 4,
Line 40, "describe" should read -- described --.

Column 5,
Line 7, "applied is" should read -- applied to --;
Line 25, "is" should read -- are --.

Column 6,
Line 19, "FIG. 9" should read -- FIG. 9. --.

Column 7,
Line 10, "a" should read -- an --.

Column 10,
Line 22, "thickness" should read -- thickness of --.

Column 11,
Line 44, "highquality" should read -- high-quality --.

Column 12,
Line 40, "image" should read -- image, --.

Column 13,
Line 30, "wherein," should read -- wherein --.

UNITED STATES PATENT AND TRADEMARK OFFICE
CERTIFICATE OF CORRECTION

PATENT NO.   : 6,088,130
DATED        : July 11, 2000
INVENTOR(S)  : Yushi Matsukubo It is certified that error appears in the above-identified patent and that said Letters Patent is hereby corrected as shown below:

<u>Column 16,</u>
Insert Claim 57
-- 57. A computer readable Storage medium storing a program for performing an image processing method, said method comprising the steps of:

inputting image data;

processing the image data to output reproduction data by using a processing unit;

extracting a characteristic of the image data;

generating a control signal based upon the characteristic of the image data;

compressing the control signal;

storing the compressed control signal in a storing unit; and expanding the compressed control signal stored in the storing unit, wherein in said processing step, the processing is performed by using the control signal expanded in said expanding step. --

Signed and Sealed this

Nineteenth Day of February, 2002

*Attest:*

JAMES E. ROGAN
*Attesting Officer*     Director of the United States Patent and Trademark Office